(12) United States Patent
Staub et al.

(10) Patent No.: US 8,450,029 B2
(45) Date of Patent: May 28, 2013

(54) MULTI-LAYER BODY AND PROCESS FOR THE PRODUCTION OF A MULTI-LAYER BODY

(75) Inventors: Rene Staub, Hagendom (CH); Wayne Robert Tompkin, Baden (CH); Andreas Schilling, Hagendom (CH)

(73) Assignee: OVD Kinegram AG, Zug (CH)

( * ) Notice: Subject to any disclaimer, the term of this patent is extended or adjusted under 35 U.S.C. 154(b) by 0 days.

(21) Appl. No.: 13/252,541

(22) Filed: Oct. 4, 2011

(65) Prior Publication Data

US 2012/0038988 A1 Feb. 16, 2012

Related U.S. Application Data

(63) Continuation of application No. 11/884,149, filed as application No. PCT/EP2006/001127 on Feb. 9, 2006, now Pat. No. 8,053,146.

(30) Foreign Application Priority Data

Feb. 10, 2005 (DE) .......................... 10 2005 006 277

(51) Int. Cl.
*G03H 1/02* (2006.01)

(52) U.S. Cl.
USPC ........................... 430/1; 430/2; 359/3; 359/25

(58) Field of Classification Search
None
See application file for complete search history.

(56) References Cited

U.S. PATENT DOCUMENTS

| | | | |
|---|---|---|---|
| 3,944,420 | A | 3/1976 | Gale et al. |
| 4,856,857 | A | 8/1989 | Takeuchi et al. |
| 4,882,477 | A | 11/1989 | Oogita et al. |
| 5,116,548 | A | 5/1992 | Mallik et al. |
| 5,310,222 | A | 5/1994 | Chatwin et al. |
| 5,340,637 | A | 8/1994 | Okai et al. |
| 5,411,296 | A | 5/1995 | Mallik |
| 5,538,753 | A | 7/1996 | Antes et al. |
| 5,920,417 | A | 7/1999 | Johnson |
| 5,991,078 | A | 11/1999 | Yoshitake et al. |
| 6,060,143 | A | 5/2000 | Tompkin et al. |
| 6,087,075 | A * | 7/2000 | Kler et al. ..................... 430/321 |
| 7,425,894 | B2 * | 9/2008 | Lutz et al. ................... 340/572.1 |
| 7,821,716 | B2 | 10/2010 | Staub et al. |
| 2002/0018430 | A1 * | 2/2002 | Heckenkamp et al. .. 369/109.01 |

(Continued)

FOREIGN PATENT DOCUMENTS

| | | |
|---|---|---|
| DE | 4130896 | 7/1992 |
| DE | 10318157 | 11/2004 |

(Continued)

*Primary Examiner* — Martin Angebranndt
(74) *Attorney, Agent, or Firm* — Hoffmann & Baron, LLP

(57) ABSTRACT

A multi-layer body having a partially shaped first layer and a diffractive first relief structure shaped in a first region of a replication layer. The first layer is applied to the replication layer in the first region and, in a second region, a photosensitive layer is applied to the first layer or a photosensitive washing mask is applied thereto as a replication layer. The photosensitive layer or the washing mask is exposed through the first layer so that the photosensitive layer or washing mask is exposed differently due to the first relief structure in the first and in the second regions, and the first layer is removed using the exposed photosensitive layer or washing mask as a mask layer in the first region but not in the second region or in the second region but not in the first region.

20 Claims, 13 Drawing Sheets

U.S. PATENT DOCUMENTS

| | | | |
|---|---|---|---|
| 2002/0093901 A1 | 7/2002 | Davies et al. | |
| 2003/0223616 A1 | 12/2003 | D'Amato et al. | |
| 2004/0020086 A1 | 2/2004 | Hudson | |
| 2005/0063067 A1 | 3/2005 | Phillips et al. | |
| 2006/0164249 A1 | 7/2006 | Lutz et al. | |
| 2006/0181077 A1* | 8/2006 | Kaule et al. | 283/72 |
| 2006/0209412 A1 | 9/2006 | Schilling et al. | |
| 2006/0251863 A1 | 11/2006 | Katschorek et al. | |
| 2007/0076279 A1* | 4/2007 | Holmes et al. | 359/2 |
| 2008/0246272 A1* | 10/2008 | Vast et al. | 283/94 |
| 2009/0317593 A1 | 12/2009 | Smith et al. | |

FOREIGN PATENT DOCUMENTS

| | | | |
|---|---|---|---|
| DE | 10328760 | | 1/2005 |
| DE | 10333704 | | 4/2005 |
| EP | 0216947 | | 4/1987 |
| EP | 0537439 | | 4/1993 |
| EP | 1501045 | | 1/2005 |
| GB | 2136352 | | 9/1984 |
| JP | 58200275 | | 11/1983 |
| JP | 59083111 | | 5/1984 |
| JP | 62111423 | | 5/1987 |
| JP | 63070478 | | 3/1988 |
| JP | 63138541 | | 6/1988 |
| JP | 01126606 | | 5/1989 |
| JP | 06-075516 | * | 3/1994 |
| JP | 08-123299 | * | 5/1996 |
| JP | 2004078056 | | 3/2004 |
| JP | 2004-101834 | * | 4/2004 |
| WO | WO9522454 | | 8/1995 |
| WO | WO9956964 | | 11/1999 |
| WO | WO0100418 | | 1/2001 |
| WO | WO0100426 | | 1/2001 |
| WO | 2005/010809 | * | 2/2005 |

* cited by examiner

MULTI-LAYER BODY AND PROCESS FOR THE PRODUCTION OF A MULTI-LAYER BODY

CROSS-REFERENCE TO RELATED APPLICATIONS

This application is a continuation application of U.S. application Ser. No. 11/884,149, filed on Sep. 17, 2007, now U.S. Pat. No. 8,053,146, which claims priority based on an International Application filed under the Patent Cooperation Treaty, PCT/EP2006/001127, filed on Feb. 9, 2006 and German Application No. 102005006277.6-45, filed on Feb. 10, 2005, the specifications of all are incorporated herein by reference, in their entirety, for all purposes.

FIELD OF THE INVENTION

The invention concerns a multi-layer body having a replication layer and at least one partially shaped first layer arranged thereon in register relationship with a first relief structure, and a process for the production thereof.

Such components are suitable as optical components or also as lens systems in the field of telecommunications.

BACKGROUND OF THE INVENTION

GB 2 136 352 A describes a production process for the production of a sealing film provided with a hologram as a security feature. In that case after the operation of embossing a diffractive relief structure a plastic film is metallised over its full area and then demetallised in region-wise fashion in accurate register relationship with the embossed diffractive relief structure.

Demetallisation in accurate register relationship is costly and the degree of resolution which can be achieved is limited by the adjustment tolerances and the procedure employed.

EP 0 537 439 B2 describes processes for the production of a security element with filigree patterns. The patterns are formed from diffractive structures covered with a metal layer and surrounded by transparent regions in which the metal layer is removed. It is provided that the outline of the filigree pattern is introduced in the form of a depression into a metal-coated carrier material, in that case at the same time the bottom of the depressions is provided with the diffractive structures and then the depressions are filled with a protective lacquer. Excess protective lacquer is to be removed by a scraper blade. After application of the protective lacquer, it is provided that the metal layer is removed by etching in the unprotected transparent regions. The depressions are between about 1 μm and 5 μm while the diffractive structures can involve height differences of more than 1 μm. That process which, in repetition steps, requires adjustment steps for orientation in accurate register relationship, fails when dealing with finer structures. In addition continuous metallic regions covering an area are difficult to implement as the 'spacers' are missing, for the operation of scraping off the protective lacquer.

SUMMARY OF THE INVENTION

The object of the present invention is to provide a multi-layer body and a process for the production of a multi-layer body, in which a layer which has regions in which the layer is not present can be applied in register relationship with a high level of accuracy and inexpensively.

In accordance with the invention that object is attained by a process for the production of a multi-layer body having a partially shaped first layer, wherein it is provided that a diffractive first relief structure is shaped in a first region of a replication layer of the multi-layer body, that the first layer is applied to the replication layer in the first region and in a second region in which the relief structure is not shaped in the replication layer, with a constant surface density with respect to a plane defined by the replication layer, that a photosensitive layer is applied to the first layer or a photosensitive washing mask is applied thereto as a replication layer, that the photosensitive layer or the washing mask is exposed through the first layer so that the photosensitive layer or washing mask is exposed differently due to the first relief structure in the first and in the second regions, and that the first layer is removed using the exposed photosensitive layer or washing mask as a mask layer in the first region but not in the second region or in the second region but not in the first region.

The object is further attained by a multi-layer body having a replication layer and at least one partially shaped first layer arranged on the replication layer, wherein it is provided that a diffractive first relief structure is shaped in a first region of the replication layer, the first relief structure is not shaped in the replication layer in a second region of the replication layer, and the first layer is partially removed in a manner determined by the arrangement of the first relief structure so that the first layer is removed in accurate register relationship with the first relief structure in the first region but not in the second region or in the second region but not in the first region.

The object is further attained by a process for the production of a multi-layer body having a partially shaped second layer wherein it is provided that a diffractive first relief structure is shaped in a first region of a replication layer of the multi-layer body, a first layer is applied to the replication layer in the first region and in a second region in which the relief structure is not shaped in the replication layer, with a constant surface density with respect to a plane defined by the replication layer, that a photosensitive layer or photosensitive washing mask is exposed through the first layer so that the photosensitive layer or washing mask is exposed differently due to the first relief structure in the first and in the second regions, and that the second layer is removed using the exposed photosensitive layer or washing mask as a mask layer in the first region but not in the second region or in the second region but not in the first region.

The use of a multi-layer body according to the invention as an exposure mask for the production of a further multi-layer body with a partially shaped-out further layer is ideal. It is provided in that respect that the exposure mask has a replication layer, that a diffractive first relief structure is shaped in a first region of the replication layer, that the first relief structure is not shaped in the replication layer in a second region of the replication layer, and that a first layer is applied to the replication layer in the first region and in a second region in which the first relief structure is not shaped in the replication layer so that a photosensitive layer or photosensitive washing mask exposed through the first layer is exposed differently in the first and second regions due to the first relief structure.

The invention is based on the realisation that the diffractive relief structure in the first region influences physical properties of the first layer applied to the replication layer in that region, for example effective thickness or optical density, so that the transmission properties of the first layer differ in the first and second regions. The first layer is now used in an exposure process as a 'mask layer' for partial removal of the first layer itself by a procedure whereby a photosensitive layer adjoining the first layer is exposed through the first layer— that is to say the functional layer. That affords the advantage, over the mask layers applied with conventional processes, that the mask layer is oriented in accurate register relationship without additional adjustment complication and expenditure. The first layer is an integral component part of the structure which is shaped in the replication layer. Accordingly only the tolerances of that relief structure have an influence on the tolerances of the position of the first layer. A lateral displacement between the first relief structure and regions of the first layer with the same physical properties does not occur. The arrangement of regions of the first layer with the same physical properties is exactly in register relationship with the first relief structure. Additional tolerances do not arise. The first layer is a layer which performs a dual function. On the one hand it implements the function of a highly accurate exposure mask for the production procedure while on the other hand at the end of the production procedure it forms a highly accurately positioned functional layer, for example an OVD layer or a conductor track or a functional layer of an electrical component, for example an organic semiconductor component.

Furthermore it is possible to produce structured layers of very high resolution by means of the invention. The degree of registration and resolution which can be achieved is approximately better by a factor of 100 than that which can be attained by known demetallisation processes. As the width of the structure elements of the first relief structure can be in the region of the wavelength of visible light (between about 380 and 780 nm) but also below same, it is possible to produce pattern regions enjoying very fine contours. That means that in this respect also great advantages are achieved in comparison with the demetallisation processes used hitherto, and it is possible with the invention to produce security elements with a higher level of safeguard against copying and forgery than hitherto.

It is possible to produce lines and/or dots with a high level of resolution, for example of a width or of a diameter respectively of less than 5 µm, in particular to about 200 nm. Preferably levels of resolution in the region of between about 0.5 µm and 5 µm, in particular in the region of about 1 µm, are achieved. In comparison, processes which involve adjustment in register relationship make it possible to implement line widths of less than 10 µm, only at a very high level of complication and expenditure.

The first layer is preferably applied to the replication layer by means of sputtering, vapor deposition or spraying thereon. Due to the procedure involved the sputtering operation involves a directed application of material so that, when applying material of the first layer by sputtering in a constant surface density with respect to the plane defined by the replication layer, to the replication layer which is provided with the relief structure, the material is deposited locally in differing thicknesses. At least partially directed application of material is preferably also produced, due to the procedure involved, when the first layer is applied by vapor deposition and spraying.

The multi-layer body can be a film element or a rigid body. Film elements are used for example to provide documents, banknotes or the like with security features. That can involve security threads for being woven into paper or for being introduced into a card, which can be formed with the process according to the invention with a partial demetallisation in perfect register relationship with an OVD design.

Advantageously rigid bodies such as an identity card, a base plate for a sensor element or a housing shell portion for a cell phone can also be provided with the partially demetallised layers according to the invention, which are in register relationship with functional structures or with a diffractive design element. It can be provided that the replication layer is introduced and structured directly with the injection molding tool or by means of shaping with a punch or die using UV lacquer. It can however also be provided that the method as set forth hereinbefore can be used to produce an exposure mask for producing a further multi-layer body. An exposure mask according to the invention is distinguished by a particularly high level of resolution which cannot be achieved with other mass production processes for security elements or the like.

Such multi-layer bodies are suitable for example as optical components such as lens systems, exposure and projection masks or as security elements for safeguarding documents or ID cards, insofar as they cover critical regions of the document such as a passport picture or a signature of the owner or the entire document. They can also be used as components or decoration elements in the field of telecommunications.

It has further proven to be desirable if the multi-layer body is arranged in the form of a security feature in a window of a value-bearing document or the like. New security features with a particularly brilliant and filigree appearance can be generated by means of the process according to the invention. Thus it is possible for example to produce images which are semi-transparent in the transillumination mode by forming a rastering of the first layer. Furthermore it is possible for a first item of information to be rendered visible in such a window in the reflection mode and for a second item of information to be rendered visible in the transillumination mode.

Advantageous configurations of the invention are set forth in the appendant claims.

It may advantageously be provided that the first layer is applied to the replication layer over the full surface area, preferably by vapor deposition. Upon irregular application of the first layer, differences in optical density can occur in regions which are provided with a constant optical density, and a defective structure can be produced in that way.

It can further be provided that the first layer is applied to the replication layer in a thickness at which the first layer is substantially opaque and is preferably of an optical density of greater than 1.5.

Surprisingly it has been found that the ratio of the transmissivities of the regions with a diffractive relief structure can be increased by an increase in the opacity of the first layer. If thus exposure is implemented with a corresponding strength of illumination through a layer which is usually identified as being opaque (for example an optical density of 5) and which would normally not be used as a mask layer by virtue of its high optical density, particularly good results can be achieved.

It is of particular advantage if the first layer is applied to the replication layer over the full surface area thereof in a thickness at which the first layer is of an optical density of between 2 and 7.

Advantageously it is provided that the first layer is formed by a metal layer or by a layer of a metal alloy. Such layers can be applied with tried-and-tested processes such as sputtering and they are already of sufficient optical density when small layer thicknesses are involved. The first layer however can also be a non-metallic layer which for example can be colored or doped, for example with nanoparticles or with nanospheres in order to increase their optical density.

It can further be provided that a second relief structure is shaped in the replication layer in the second region and that shaped in the replication layer as a first relief structure is a diffractive relief structure which increases the transmission of the first layer in the first region with respect to the transmission of the first layer in the second region. For that purpose the first structure can be produced with a greater relief depth than the second structure. It can further be provided that the product of spatial frequency and relief depth of the first structure is greater than the product of spatial frequency and relief depth of the second structure. It is also possible thereby that the configuration of the relief structure of the replication layer in the first region and in the second region increases the transmission of the layer applied to the replication layer in the first region in relation to the layer applied in the second region. The second relief structure can further be such that in the second region the interface layer between the replication layer and the first layer is substantially planar.

To produce particularly great differences in terms of the optical density of the first and the second relief structures, a diffractive relief structure with a high depth-to-width ratio in respect of the individual structure elements and in particular with a depth-to-width ratio of >0.3 can be shaped as the first relief structure in the first region and the second relief structure can be in the form of a relief structure with a low depth-to-width ratio.

With a suitable choice in respect of the layer thickness for the first layer, the use of special diffractive relief structures of that kind makes it possible to generate very great differences, which are already distinguishable with the eye, in the optical density of the first layer in the first region and in the second region. Surprisingly however it was found that such great differences in transmission in the first and second regions are not compellingly necessary for implementation of the process according to the invention. Structures with slight differences in the depth-to-width ratio also usually have relatively slight differences in transmission, when thin vapor deposition is involved. Even slight relative differences however can be strengthened by an increase in the layer thickness of the first layer and thus the mean optical density. Thus, good results can be achieved when the differences in transmission of the first layer in the first and second regions are already quite slight. The first layer can be a very thin layer of the order of magnitude of some nm. The first layer applied with a uniform surface density, with respect to the plane defined by the replication layer, is considerably thinner in regions with a high depth-to-width ratio than in regions with a low depth-to-width ratio.

The dimensionless depth-to-width ratio is a characteristic feature for enlarging the surface of preferably periodic structures, for example of a sine-square configuration. The depth here is the spacing between the highest and the lowest successive points of such a structure, that is to say the spacing between a 'peak' and a 'trough'. The spacing between two adjacent highest points, that is to say between two 'peaks', is referred to as the width. Now, the higher the depth-to-width ratio, the correspondingly steeper are the 'peak flanks', and the correspondingly thinner is the first layer which is deposited on the 'peak flanks'. The effect of producing a higher level of transmission and in particular transparency with an increase in the depth-to-width ratio is also observed in the case of structures with vertical flanks, for example in the case of rectangular gratings. This however can also involve structures to which this model cannot be applied. By way of example, the situation may involve discretely distributed regions in line form, which are only in the form of a 'trough', wherein the spacing between two 'troughs' is a multiple greater than the depth of the 'troughs'. Upon formal application of the above-specified definition the depth-to-width ratio calculated in that way would be approximately zero and would not reflect the characteristic physical condition. Therefore, in the case of discretely arranged structures which are formed substantially only from a 'trough', the depth of the 'trough' is to be related to the width of the 'trough'.

As it was surprisingly found, in that respect it is not important for the regions with a high depth-to-width ratio to be transparent. This can involve structures which for example form optically active regions of a hologram or Kinegram® security feature. The only important consideration is that those regions are delimited in relation to other regions by virtue of their transmission properties or a lesser or a greater optical density.

It can advantageously be provided that the second relief structure is in the form of an optically active, preferably diffractive structure. The structures which implement that are both reflecting and also transmitting light-diffracting, light-refracting or light-scattering micro- or nanostructures. That can involve for example grating structures such as linear gratings or cross gratings, image-generating structures such as a hologram or Kinegram®, isotropic or anisotropic matt structures, binary or continuous Fresnel lenses, micro-prisms, micro-lenses, blaze gratings, combination structures, macrostructures and so forth. After removal of the first layer in the first region that optically active structure is deposited in accurate register relationship with the first layer so that security features with a high forgery-resistant nature can be generated in that way.

The first and second relief structure can in that case involve relief structures, for example a Kinegram®, in which one or more relief parameters, for example orientation, fineness or profile shape vary, in order to produce the desired diffractive properties. The purpose of structures of that kind is not only to achieve a change in the transmission properties of the first layer in the region in which the relief structure is shaped into the replication layer, but additionally also the function of acting as an optically variable design element upon being deposited with a reflection layer or an optical separation layer. If, besides a first relief structure of that kind, a second relief structure of that kind is also shaped in the replication layer, the first and relief structures preferably differ in one or more parameters which are relevant in terms of the transmission properties of the first layer, and thus differ for example in relief depth or in the depth-to-width ratio. Thus it is possible for example for two Kinegram® security features to be shaped in the replication layer, in partially overlapping relationship with a filigree line pattern. The first Kinegram® forms the first relief structure and the second Kinegram® forms the second relief structure. The relief structures of the two designs differ in the typical depth-to-width ratio while the other structure parameters are similar. We thus have three 'groups' of structures, namely structures of group I in the first Kinegram®, structures of group II in the second Kinegram® and structures of group III in the background. In a first step, the first layer remains, for example a vapor-deposited metal layer such as a copper layer, while in the Kinegram® region of the first design, the rest is removed. Then another material, for example aluminum, is vapor-deposited over the entire area and removed by suitable process implementation in the background regions. That procedure affords two designs which are partially metallised in register relationship but which differ in the metal layer that faces towards the viewing person (copper, aluminum).

The process can further be such that a photosensitive material with a binary characteristic is applied as the photosensitive layer or as the photosensitive washing mask and the photosensitive layer or the photosensitive washing mask is exposed through the first layer in an exposure strength and with an exposure duration, the photosensitive layer or the photosensitive washing mask is activated in the first region in which the transmission of the first layer is increased by the first relief structure and is not activated in the second region. The process according to the invention can also be used if the optical densities of the first region and the second region differ only slightly from each other, in which respect, as already explained hereinbefore, it is surprisingly possible to be based on a high mean optical density.

An advantageous configuration provides that the photosensitive layer or washing mask is exposed through the first layer by means of UV radiation.

Experiments have demonstrated that the differences which can be achieved by virtue of the differing configuration of the relief structure in the first and second regions, in the transmission properties of the first layer, are particularly pronounced in the range of UV radiation. Particularly good results can thus be achieved when using UV radiation for the exposure operation.

A photosensitive washing mask can be provided as the photosensitive layer, in which respect the regions of the photosensitive washing mask which are activated by the exposure operation and the regions of the first layer which are arranged there are removed in a washing process.

The photosensitive layer however can also involve a layer which is developed after the exposure operation and then forms an etching mask for the first layer.

In addition there can be a photosensitive layer which is activated by exposure in the first region in which transmission of the first layer is enhanced by the first relief structure, and then forms an etching agent for the first layer.

The photosensitive layer can be a photoresist which can be in the form of a positive or a negative photoresist. In that way different regions of the first layer can be removed with the replication layer being otherwise of the same nature.

It can further be provided that the photosensitive layer is in the form of a photopolymer.

By way of example lyes or acids can be provided as the etching agent for the first layer. It can further be provided that the first layer is only partially removed and the etching operation is interrupted as soon as a predetermined degree of transparency is attained. That makes it possible to produce for example security features which are based on locally different transparency.

If for example aluminum is used as the first layer lyes such as NaOH or KOH can be used as an isotropically acting etching agent. It is also possible to use acid media such as PAN (a mixture of phosphoric acid, nitric acid and water).

The reaction speed typically increases with the concentration of the lye and temperature. The choice of the process parameters depends on the reproducibility of the procedure and the resistance of the multi-layer body.

Influencing factors when etching with lye are typically the composition of the etching bath, in particular the concentration of etching agent, the temperature of the etching bath and the afflux flow conditions of the layer to be etched in the etching bath. Typical parameter ranges in respect of the concentration of the etching agent in the etching bath are in the region of between 0.1% and 10% and in respect of temperature in the region of between 20° C. and 80° C.

The etching operation for the first layer can be electrochemically assisted. The etching operation is intensified by the application of an electrical voltage. The action is typically isotropic so that the structure-dependent increase in surface area additionally intensifies the etching effect. Typical electrochemical additives such as wetting agents, buffer substances, inhibitors, activators, catalysts and the like in order to remove for example oxide layers can promote the etching procedure.

During the etching procedure depletion of etching medium or enrichment in respect of the etching products can occur in the interface layer in relation to the first layer, whereby the etching speed is slowed down. Forced mixing of the etching medium, possibly by the production of a suitable flow or ultrasound excitation, improves the etching characteristics.

The etching procedure can further involve a temperature profile in respect of time in order to optimise the etching result. Thus etching can be effected in the cold condition at the beginning and warmer with an increasing period of operation. That is preferably implemented in the etching bath by a three-dimensional temperature gradient, in which case the multi-layer body is drawn through an elongate etching bath with different temperature zones.

The last nanometers of the first layer can prove to be relatively stubborn and resistant to etching in the etching procedure. Therefore, slight mechanical assistance for the etching process is advantageous for removing the remains of the last layer. The stubbornness is based on a possibly slightly different composition in respect of the first layer, presumably by virtue of interface layer phenomena when the first layer is formed on the replication layer. In that case the last nanometers of the first layer are preferably removed by a wiping process by the multi-layer body being passed over a roller covered with a fine cloth. The cloth wipes off the remains of the first layer without damaging the multi-layer body.

The etching operation does not have to involve a finishing step which is carried out with fluids. It can also be a 'dry process' such as for example plasma etching.

In addition laser ablation has proved its worth for removing the first layer. In the case of structures with a high depth-to-width ratio and in particular relief structures in which the typical spacing between two adjacent raised portions is less than the wavelength of the incident light, so-called zero order structures, a large part of the incident light can be absorbed, even if the degree of reflection of the reflection layer, in a region involving mirror reflection, is high. The first layer which is in the form of a reflection layer is irradiated by means of a focused laser beam, in which case the laser radiation is absorbed to an increased extent and the reflection layer is correspondingly increased in temperature in the strongly absorbent regions which have the above-mentioned structures with a high depth-to-width ratio. With high levels of energy input the reflection layer can locally spall off, in which case removal or ablation of the reflection layer or coagulation of the material of the reflection layer occurs. If energy input by the laser is effected only over a short period of time and the effect of thermal conduction is thus only slight, ablation or coagulation occurs only in the regions which are pre-defined by the relief structure.

Influencing factors in laser ablation are the configuration of the relief structure (period, depth, orientation, profile), the wavelength, polarisation and angle of incidence of the incident light radiation, the duration of the action (time-dependent power) and the local dose of laser radiation, the properties and the absorption characteristics of the first layer, as well as the first layer possibly having further layers covering it above it or below it, such as the structured photosensitive or washing lacquer layer.

Inter alia Nd:YAG lasers have proven to be suitable for the laser treatment. They emit at about 1064 mm and are preferably also operated in a pulsed mode. It is further possible to use diode lasers. The wavelength of the laser radiation can be altered by means of a frequency change, for example frequency doubling.

The laser beam is guided over the multi-layer body by means of a so-called scanning device, for example by means of galvanometric mirrors and a focusing lens. Pulses of a duration in the region of nanoseconds to microseconds are emitted during the scanning operation and lead to the above-described ablation or coagulation of the first layer, as is predetermined by the structure. The pulse durations are typically below milliseconds, advantageously in the region of a few microseconds or less. It is thus certainly also possible to use pulse durations of nanoseconds to femtoseconds. Precise positioning of the laser beam is not necessary as the procedure is self-referencing insofar as the photosensitive layer or washing mask, which is present in structured form, partially prevents access of the laser radiation to the first layer. The procedure is preferably further optimised by a suitable choice in respect of the laser beam profile and overlapping of adjoining pulses.

It is however equally possible to control the path of the laser over the multi-layer body in register relationship with relief structures disposed in the replication layer or openings in the photosensitive layer or washing mask, so that only regions with the same relief structure or with/without openings in the photosensitive layer or washing mask are irradiated. For example camera systems can be used for such control.

Instead of a laser which is focused on to a point or a line it is also possible to use areal radiating devices which emit a short, controlled pulse such as for example flash lights.

The advantages of the laser ablation process include inter alia the fact that the partial removal of the first layer, in register relationship with a relief structure, can also take place if it is covered on both sides with one or more further layers which are transmissive in respect of the laser radiation, and it is thus not directly accessible to etching media. The first layer is only broken up by the laser. The material of the first layer breaks off again in the form of small conglomerates or small balls which are not optically visible to the viewing person and which only immaterially influence the transparency in the irradiated region.

Residues from the first layer which have still remained on the replication layer after the laser treatment can optionally be removed by means of a subsequent washing procedure if the first layer is directly accessible.

After etching of the first layer it can be provided that the residues of the etching masks are removed.

In a further advantageous configuration a second layer can be introduced into the regions in which the first layer has been removed. It can further be provided that the first layer is removed and replaced by a third layer. The process according to the invention is therefore not restricted to the partial removal of a layer but it can have further process steps which provide for the interchange of layers or the repetition of process steps when using differences in optical density for forming or differentiating regions.

It can further be provided that the first layer and/or the second layer and/or the third layer are galvanically reinforced if these involve electrically conductive layers or layers which are suitable for current-less galvanisation.

For a multi-layer body produced in accordance with the described process it can be provided that the second region comprises two or more partial regions enclosed by the first region, an optically active second relief structure is shaped in the replication layer in the second region and the first layer is a reflection layer which is removed in the first region and thus arranged in accurate register relationship with the second relief structure. Such multi-layer bodies can advantageously be provided as forgery-resistant security elements. They are already particularly forgery-resistant for the reason that particularly small line widths can be formed with the process according to the invention.

In addition, because of their diffractive structure and their orientation in relation to the reflection layer in accurate register relationship, those fine lines can produce optical effects which can be imitated only with extreme difficulty. The multi-layer body can involve for example a transfer film, in particular a hot stamping film or a laminating film.

It can further be provided that the first region comprises two or more partial regions enclosed by the second region or vice-versa and that the first layer is a reflection layer which is removed in the second region and thus arranged in accurate register relationship with the first relief structure.

Advantageous configurations provide that the partial regions of the second region or the partial regions of the first region are of a width of less than 2 mm, preferably less than 1 mm.

Further configurations provide that, in the multi-layer body according to the invention, a second layer is arranged in the regions of the replication layer in which the first layer has been removed.

It can be provided that the first layer and/or the second layer is/are formed from a dielectric, for example $TiO_2$ or ZnS, or a semiconductor. In that case the first layer and the second layer have different refractive indices so that optical effects can be produced thereby.

The first layer and/or the second layer can also involve a polymer so that for example the one layer can be in the form of an electrical conductor and the other layer can be in the form of an electrical insulator, in which respect both layers can be in the form of transparent layers.

By way of example the first layer and/or the second layer can form an electronic component, for example an antenna, a capacitor, a coil or an organic semiconductor component. As explained hereinbefore it is possible to provide further layers which can be arranged in accurate register relationship on the multi-layer body with the process according to the invention.

It can also be provided that the succession of partial removal of layers or partial demetallisations and the association with the structures in the first and second regions is so selected that regions are produced, in which different diffractive structures are interlaced with each other. This may involve for example a first Kinegram® and a second Kinegram® which have a different depth-to-width ratio and which are arranged in front of a background. In that example it can be provided that a vapor-deposited copper layer is left only in the region of the first Kinegram® security feature, then aluminum is applied by vapor deposition over the entire surface area and removed in the background regions by suitable process implementation. That produces two designs which are partially metallised in register relationship and which differ in the metal layer which faces towards the viewing person.

The relief structures introduced into the replication layer can also be so selected that they can serve for orientation of liquid crystal (polymers). Thus in that case the replication layer and/or the first layer can be used as an orientation layer for liquid crystals. For example structures in groove form are introduced into such orientation layers, wherein the liquid crystals are oriented in relation to such structures before they are fixed in their orientation in that position by crosslinking or in some other fashion. It can be provided that the crosslinked liquid crystal layer forms the second layer.

The orientation layers can have regions in which the orientation direction of the structure constantly changes. If a region formed by means of such a diffractive structure is viewed through a polariser with for example a rotating direction of polarisation, various clearly discernible security features, for example motion effects, can thus be produced by virtue of the linearly changing direction of polarisation of the region. It can also be provided that the orientation layer has diffractive structures for orientation of the liquid crystals, which are locally differently oriented so that the liquid crystals when considered under polarised light represent an item of information such as for example a logo.

It can also be provided that the first layer and/or the second layer is/are in the form of a colored layer.

Colored regions can also be produced in accordance with the process described hereinafter. A multi-layer body is produced by means of the process according to the invention, using a colored photosensitive layer or washing mask. Coloring can be effected in that case by means of pigments or soluble dyestuffs.

Then the photosensitive layer is exposed through the first layer, by means for example of UV radiation, and hardened or destroyed in the first regions, depending on whether it is a positive or the negative resist. In that case positive and negative resist layers can also be applied in mutually juxtaposed relationship and exposed at the same time. In that case the first layer serves as a mask and is preferably arranged in direct contact with the photoresist so that precise exposure can be effected.

Finally, when developing the photoresist, the regions which have not been hardened are washed off or the destroyed regions are removed. Depending on the respective photoresist used the developed colored photoresist is now either present precisely in the regions in which the first layer is transparent or opaque in relation to the UV radiation. In order to increase the resistance of the photoresist layer which has remained and which is structured in accordance with the first layer, regions which have remained are preferably post-hardened after the development operation.

Finally the first layer which is used as the mask can be removed by a further etching step to such an extent that the multi-layer body only has a highly resolved 'color print' of photoresist for the viewing person, but is otherwise transparent. In that situation the photoresist functions as an etching mask.

Advantageously, display elements of high resolution can be produced in that way. Without departing from the scope of the invention it is possible for differently colored display elements to be applied in accurate register relationship and for them to be arranged for example in an image dot raster. As different multi-layer bodies can be produced with an initial layout in respect of the first layer, by a procedure whereby for example different exposure and etching processes are combined together or are carried out in succession, positioning in accurate register relationship of the successively applied layers is possible when using the process according to the invention, in spite of an increase in the process steps.

Further optical effects can be produced if the first layer and/or the second layer is/are formed from a plurality of partial layers, in particular if the partial layers form a thin film layer system.

It can be provided that the partial layers are formed from different materials. Such a configuration can be provided not just for the above-mentioned thin film layer system. In that way for example nanotechnology function elements can also be produced, for example a bimetal switch involving dimensions in the μm range can be produced from two different metallic layers.

In further configurations it can be provided that the first layer and/or the second layer forms/form an optical pattern. This can involve a raster image.

Rastering of the first layer is also possible to the effect that, beside raster elements which are underlaid with a reflection layer and which have possibly different diffractive diffraction structures, there are provided raster elements which represent transparent regions without a reflection layer. In that respect amplitude-modulated or area-modulated rastering can be selected as the rastering effect. Attractive optical effects can be achieved by a combination of such reflective/diffractive regions and non-reflective, transparent—under some circumstances also diffractive—regions. If such a raster image is arranged for example in a window in a value-bearing document, a transparent raster image can be perceived in the transillumination mode. In the incident illumination mode that raster image is visible only in a given angular range in which no light is diffracted/reflected by the reflecting surfaces. It is further possible for such elements to be used not only in a transparent window but also to be applied to a colored imprint. In a given angular range the colored imprint is visible for example in the form of the raster image while in another angular range it is not visible by virtue of the light which is reflected by the diffraction structures or other (macro-) structures. Furthermore it is also possible for a plurality of outgoing reflection regions which decrease in their reflectivity to be produced by a suitably selected rastering effect.

It can also be provided that the first layer is not completely removed, but its layer thickness is merely reduced. Such a configuration can be particularly advantageous if regions are to be produced which have mutually superposed layers, for example in order to vary optical and/or electrical properties or to produce decorative effects.

In the above-described process of using an exposure mask with a replication layer and a first layer in order to structure the second layer, it can be provided that the replication layer is applied to a carrier layer of an exposure mask.

That process can preferably also be combined with the above-described further steps, that is to say the process can be combined in the same manner as the process of with the further features of the dependent claims. That also applies to the exposure mask which is used in the process.

It can further be provided that the photosensitive layer or photosensitive washing mask is arranged on the second layer and is exposed through the second layer. As already described hereinbefore for that purpose the second layer does not have to be in the form of a transparent layer. The second layer can be in the form of an opaque layer for it reduces the illumination intensity in all regions of the photosensitive layer or the photosensitive washing mask to the same degree. Therefore the differences in the exposure mask in terms of optical density are retained and a true representation of the exposure mask is produced on the photosensitive layer or the photosensitive washing mask. When using a washing mask it can be provided that the second layer is arranged on the washing mask as the final lowermost layer so that the second layer is not arranged in the beam path between the exposure mask and the washing mask. In such a case the second layer can be completely opaque. Washing away the exposed regions of the washing mask provides that the second layer disposed in those regions can be removed. It can advantageously be provided that the washing mask which has remained under the non-removed regions of the second layer is sealed in relation to environmental influences by the application of a protective layer and in that way a particularly reliable multi-layer body is formed.

In a further advantageous configuration it can be provided that the exposure mask is joined to the multi-layer body. As already described hereinbefore the processes according to the invention offer many different possible ways of producing multi-layer bodies and the process steps are not limited to a one-off use. If therefore firstly a multi-layer body which is in the form of an exposure mask has been produced, it can then be used like a conventional exposure mask for example as an exposure mask in semiconductor manufacture. Such an exposure mask is not permanently joined to the second multi-layer body and can be removed after the exposure operation.

It can also be provided however that the second multi-layer body is built up in layer-wise fashion on the exposure mask. If it is provided that the exposure mask is removed after exposure or at a later time, a separation layer can be arranged between the exposure mask and the second multi-layer body, which permits such release.

In a further advantageous configuration it can be provided that the exposure mask is permanently joined to the second multi-layer body and in that way a third multi-layer body is produced, which can be provided as an end product or as an intermediate product for further layer-wise construction of a multi-layer body which is still more complex.

As already set forth the multi-layer bodies can involve both flexible film elements and also rigid elements, for example semiconductor chips or surfaces of electronic devices such as for example cell telephones.

BRIEF DESCRIPTION OF THE DRAWINGS

The invention will be described in greater detail with reference to the drawings in which.

DETAILED DESCRIPTION OF THE INVENTION

Figure 1:
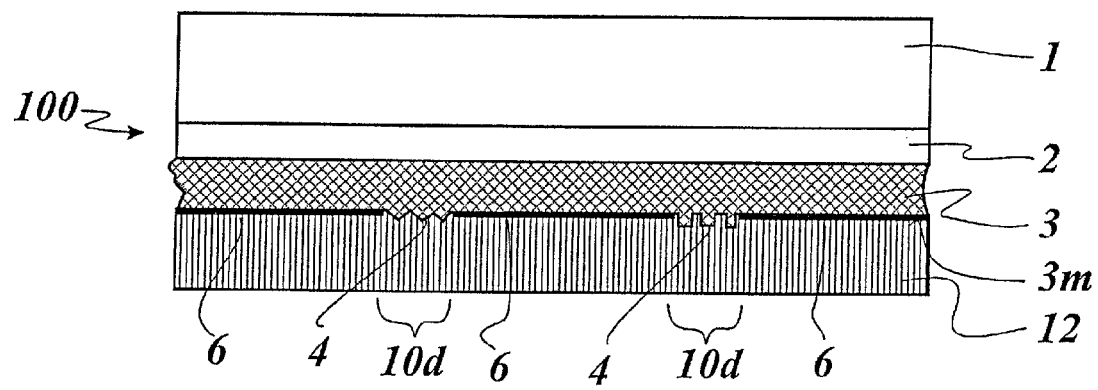
FIG. 1 shows a diagrammatic view in section of a first embodiment of a multi-layer body according to the invention.

FIG. 1 shows a multi-layer body 100 in which arranged on a carrier film 1 are a functional layer 2, a replication layer 3, a metallic layer 3m and an adhesive layer 12. The functional layer 2 is a layer which predominantly serves to enhance the mechanical and chemical stability of the multi-layer body but which can also be designed in known manner to produce optical effects, in which respect it can also be provided that the layer is formed from a plurality of partial layers. It can also involve a layer which is made from wax or which is in the form of a release layer. It can however also be provided that that layer is omitted and the replication layer 3 is disposed directly on the carrier film 1. It can further be provided that the carrier film 1 itself is in the form of a replication layer.

The multi-layer body 100 can be a portion of a transfer film, for example a hot stamping film, which is applied to a substrate by means of the adhesive layer 12. The adhesive layer 12 can be a melt adhesive which melts under the effect of heat and permanently joins the multi-layer body to the surface of the substrate.

The carrier film 1 can be in the form of a mechanically and thermally stable film comprising PET.

Regions involving different structures can be shaped into the replication layer 3 by means of known processes. In the illustrated embodiment these involve regions 4 having diffractive structures and reflecting regions 6.

The metallic layer 3m disposed on the replication layer 3 has demetallised regions 10d which are arranged in coincident relationship with the diffractive structures 4. The multi-layer body 100 appears transparent or partially transparent in the regions 10d.

FIGS. 2 through 8 now show the production stages of the multi-layer body 100. The same components as in FIG. 1 are denoted by the same references.

Figure 2:
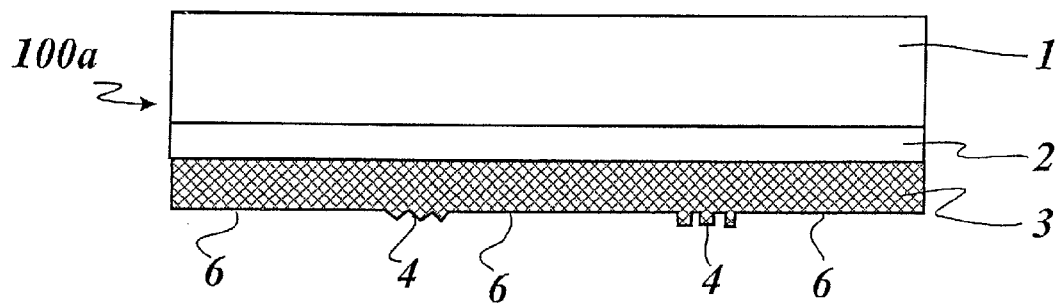
FIG. 2 shows a diagrammatic view in section of the first production stage of the multi-layer body of FIG. 1.

FIG. 2 shows a multi-layer body 100a in which the functional layer 2 and the replication layer 3 are arranged on the carrier film 1.

The replication layer 3 is structured in its surface by known processes such as for example hot stamping. For that purpose for example a thermoplastic replication lacquer is applied by printing, spraying or lacquering to constitute the replication layer 3, and a relief structure is shaped into the replication lacquer by means of a heated die or a heated replication roller.

The replication layer 3 can also be a UV hardenable replication lacquer which is structured for example by a replication roller. The structuring however can also be produced by UV radiation through an exposure mask. In that way the regions 4 and 6 can be shaped into the replication layer 3. The region 4 can be for example the optically active regions of a hologram or a Kinegram® security feature.

Figure 3:
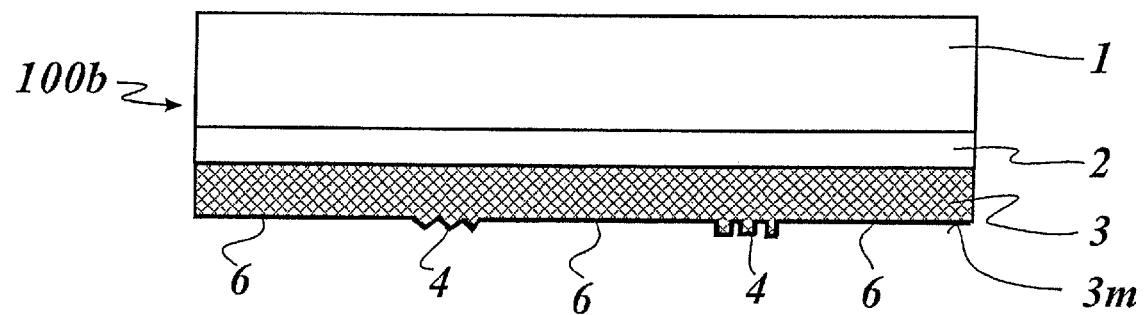
FIG. 3 shows a diagrammatic view in section of the second production stage of the multi-layer body of FIG. 1.

FIG. 3 now shows a multi-layer body 100b which is formed from the multi-layer body 100a in FIG. 2, by a procedure whereby the metallic layer 3m is applied to the replication layer 3 with a uniform surface density, for example by sputtering. In this embodiment the metallic layer 3m involves a layer thickness of some 10 nm. The layer thickness of the metallic layer 3m can preferably be so selected that the regions 4 and 6 involve a low level of transmission, for example between 10% and 0.001%, that is to say an optical density of between 1 and 5, preferably between 1.5 and 3. Accordingly the optical density of the metallic layer 3m, that is to say the negative decadic logarithm of transmission, is between 1 and 3 in the regions 4 and 6. It can preferably be provided that the metallic layer 3m involves an optical density of between 1.5 and 2.5. The regions 4 and 6 therefore appear to be opaque or reflecting to the eye of the person viewing them.

It is particularly advantageous here for the layer 3m to be applied in a layer thickness with which the layer is substantially opaque when applied to a planar surface and has an optical density of greater than 2. The thicker the metallic layer 3m applied to the replication layer 3, the greater is the effect of the change in the effective optical layer thickness, which is produced by the diffractive structure provided in the regions 4, on the transmission characteristics of the metallic layer 3m. Investigations have shown that the change in the effective optical thickness of the metallic layer 3m, caused by the diffractive structure, is approximately proportional to the vapor-deposited layer thickness and thus approximately proportional to the optical density. As the optical density represents the negative logarithm of transmission, the difference in transmission between the regions 4 and 6 is over-proportionally increased in that fashion by an increase in the surface application in respect of metallic material.

It will be noted however that the optical densities of the metallic layer 3m differ in the regions 4 and 6 in such a way that it is reduced in the regions 4 in relation to the regions 6. The responsibility for that lies with the increase in surface area in the regions 4 because of the depth-to-width ratio of the structure elements, which is different from zero, and the thickness which is reduced thereby of the metallic layer. The dimension-less depth-to-width ratio and the spatial frequency are characterising features for the increase in surface area of preferably periodic structures. Such a structure forms 'peaks' and 'troughs' in a periodic succession. The spacing between a 'peak' and a 'trough' is referred to here as the depth while the spacing between two 'peaks' is referred to as the width. Now, the higher the depth-to-width ratio, the correspondingly steeper are the 'peak flanks' and the correspondingly thinner is the metallic layer 3m deposited on the 'peak flanks'. That effect is also to be observed when the situation involves discretely distributed 'troughs' which can be arranged relative to each other at a spacing which is a multiple greater than the depth of the 'troughs'. In such a case the depth of the 'trough' is to be related to the width of the 'trough' in order to correctly describe the geometry of the 'trough' by specifying the depth-to-width ratio.

When producing regions of a reduced optical density, it is important to know and appropriately select the individual parameters in respect of their dependencies. The degree of the reduction in optical density can vary in dependence on the substrate, the lighting and so forth. In that respect an important part is played by the absorption of light in the metal layer. By way of example chromium and copper reflect much less under some circumstances.

Table 1 shows the ascertained degree of reflection of metal layers of Ag, Al, Au, Cr, Cu, Rh and Ti, arranged between plastic films (refractive index n=1.5) at a light wavelength $\lambda=550$ nm. In this case the thickness ratio $\in$ is formed as the quotient of the thickness t of the metal layer, which is required for the degree of reflection R=80% of the maximum $R_{Max}$ and the thickness required for the degree of reflection R=20% of the maximum $R_{Max}$.

TABLE 1

| Metal | $R_{Max}$ | t for 80% $R_{Max}$ | t for 20% $R_{Max}$ | $\in$ | h/d |
|-------|-----------|---------------------|---------------------|-------|------|
| Ag | 0.944 | 31 nm | 9 nm | 3.4 | 1.92 |
| Al | 0.886 | 12 nm | 1.5 nm | 4.8 | 2.82 |
| Au | 0.808 | 40 nm | 12 nm | 3.3 | 1.86 |
| Rh | 0.685 | 18 nm | 4.5 nm | 4.0 | 2.31 |
| Cu | 0.557 | 40 nm | 12 nm | 3.3 | 1.86 |
| Cr | 0.420 | 18 nm | 5 nm | 3.6 | 2.05 |
| Ti | 0.386 | 29 nm | 8.5 nm | 3.3 | 1.86 |

From the point of view of heuristic consideration silver and gold (Ag and Au), as can be seen, have a high maximum degree of reflection $R_{Max}$ and require a relatively small depth-to-width ratio to reduce the optical density of the metallic layer, in the foregoing example to produce transparency. Aluminum (Al) admittedly also has a high maximum degree of reflection $R_{Max}$, but it requires a higher depth-to-width ratio. It can preferably therefore be provided that the metal layer is formed from silver or gold. It can however also be provided that the metal layer is formed from other metals or from metal alloys.

Table 2 now shows the calculation results obtained from strict diffraction calculations for relief structures with different depth-to-width ratios, which are in the form of linear, sinusoidal gratings with a grating spacing of 350 nm. The relief structures are coated with silver of a nominal thickness $t_0=40$ nm. The light which impinges on the relief structures is of the wavelength $\lambda=550$ nm (green) and is TE-polarised or TM-polarised.

TABLE 2

| Depth-to-width ratio | Grating spacing in nm | Depth in nm | Degree of reflection (0R) TE | Degree of transparency (0T) TE | Degree of reflection (0R) TM | Degree of transparency (0T) TM |
|---|---|---|---|---|---|---|
| 0 | 350 | 0 | 84.5% | 9.4% | 84.5% | 9.4% |
| 0.3 | 350 | 100 | 78.4% | 11.1% | 50.0% | 21.0% |
| 0.4 | 350 | 150 | 42.0% | 45.0% | 31.0% | 47.0% |
| 1.1 | 350 | 400 | 2.3% | 82.3% | 1.6% | 62.8% |
| 2.3 | 350 | 800 | 1.2% | 88.0% | 0.2% | 77.0% |

As was found, in particular the degree of transparency or transmission apart for the depth-to-width ratio is dependent on the polarisation of the radiated light. That dependency is shown in Table 2 for the depth-to-width ratio d/h=1.1. It can be provided that that effect is put to use for the selective formation of further layers.

It was further found that the degree of transparency or the degree of reflection of the metal layer 3m is wavelength-dependent. That effect is particularly highly pronounced for TE-polarised light.

It was further found that the degree of transparency or transmission decreases if the angle of incidence of the light differs from the normal angle of incidence, that is to say the degree of transparency decreases if the light is not perpendicularly incident. That signifies that the metal layer 3m can be transparent or less opaque than in the reflecting regions 6, only in a restricted cone of incidence of the light. It can therefore be provided that the metal layer 3m is opaque when illuminated inclinedly, in which respect that effect can also be used for the selective formation of further layers.

Besides the depth-to-width ratio of a structure, the change in optical density is also influenced by the spatial frequency of the structure. Thus it has further been found that a change in the transparent characteristics of a layer applied to a structure can be achieved if the product of spatial frequency and relief depth is greater in a first region of the structure than the product of spatial frequency and relief depth in a second region of the structure.

The production of regions of differing transparency or transmission however can also be achieved by other effects, for example by polarisation dependency of the level of transmission as a consequence of differently oriented structures;

the form factor of the structures, that is to say structures of a rectangular, sinusoidal, sawtooth or other profile can involve a different level of transmission with the same product of spatial frequency and relief depth; and directed vapor deposition of the first layer in combination with special structures or structure combinations or structure arrangements.

If the first structure is a structure involving a stochastic profile, for example a matt structure, correlation length, roughness depth and statistical distribution of the profile can be typical parameters which influence transmission.

Thus, to produce regions involving differing transparency or transmission, it is also possible to use relief structures which differ in one or more of the above-stated parameters, in the first region and in the second region.

Figure 4:
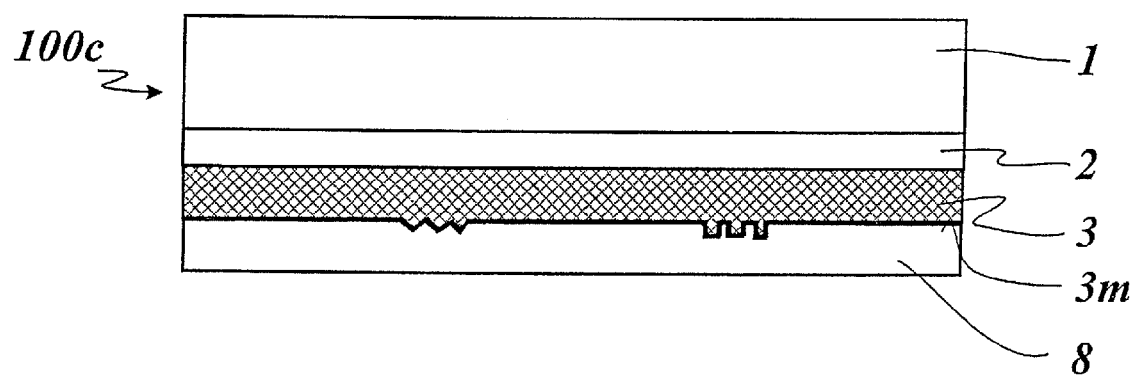
FIG. 4 shows a diagrammatic view in section of the third production stage of the multi-layer body of FIG. 1.

FIG. 4 shows a multi-layer body 100c formed from the multi-layer body 100b shown in FIG. 3 and a photosensitive layer 8. This can be an organic layer which is applied by conventional coating processes such as intaglio printing in fluid form. It can also be provided that the photosensitive layer is applied by vapor deposition or is applied by lamination in the form of a dry film.

The photosensitive layer 8 can be for example a positive photoresist such as AZ 151.2 or AZ P4620 from Clariant or S1822 from Shipley which is applied to the metal layer 3m in a surface density of 0.1 $g/m^2$ to 50 $g/m^2$. The layer thickness depends on the desired resolution and the procedure. Thus lift-off procedures involve rather thicker layers of a layer thickness of >1 μm, corresponding to a surface density of about 1 $g/m^2$. Preferred weights in relation to surface area are in the range of between 0.2 $g/m^2$ and 10 $g/m^2$.

The application can be over the entire surface area. It is however also possible to provide for application in partial regions, for example in regions arranged outside the above-mentioned regions 4 and 6. This can involve regions which have to be arranged only relatively coarsely in register relationship with the design, for example decorative graphic representations such as for example random patterns or patterns formed from repeated images or texts.

Figure 5:
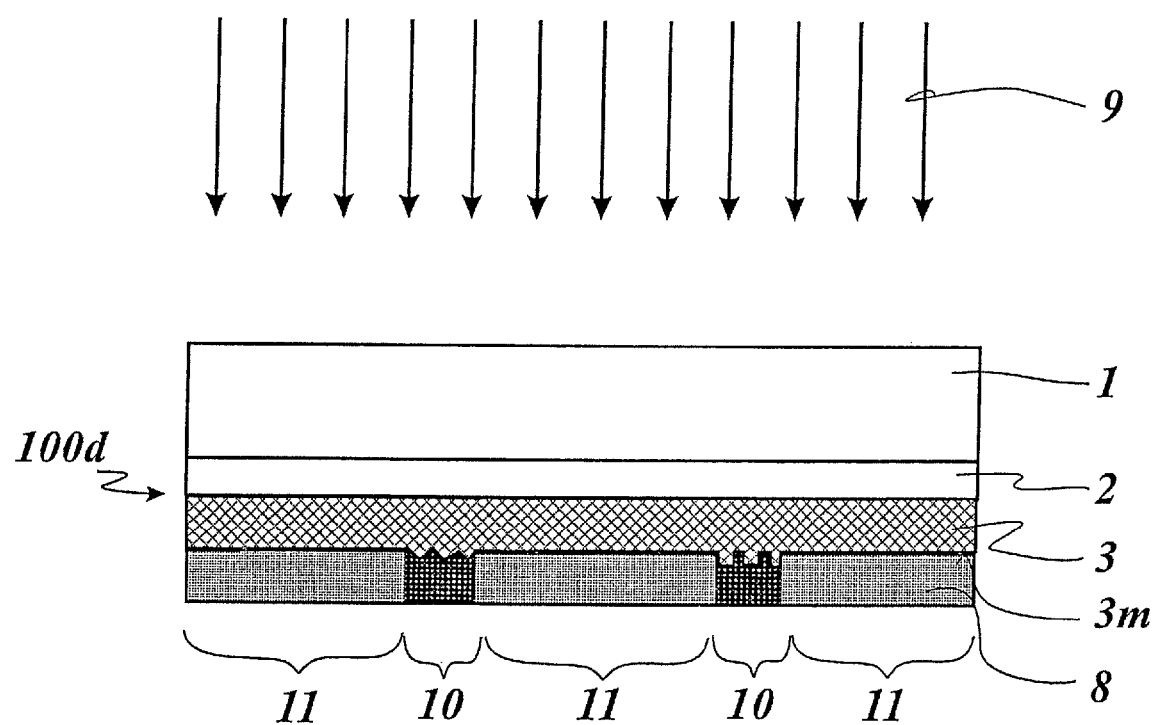
FIG. 5 shows a diagrammatic view in section of the fourth production stage of the multi-layer body of FIG. 1.

FIG. 5 now shows a multi-layer body 100d which is formed by exposure of the multi-layer body 100c in FIG. 4 through the carrier film 1. UV light 9 can be provided for the exposure operation. Because now, as described hereinbefore, the regions 4 provided with diffractive structures having a depth-to-width ratio of greater than zero have a lower optical density than the reflecting regions 6, the UV irradiation operation produces in the photosensitive layer 8 regions 10 which have been more greatly exposed and which differ from less exposed regions 11, in terms of their chemical properties.

The embodiment shown in FIG. 5 involves homogeneous illumination which is of equal intensity in all regions of the multi-layer body 100d. It is however also possible to provide for partial illumination, for example a) to leave structures with a high depth-to-width ratio as design elements and not to demetallise them;

b) to introduce an additional item of information, for example through a mask in strip form, which moves with the multi-layer body 100d during the exposure operation, c) to introduce an individual item of information such as for example a serial number. It can be provided in that respect that an identification is introduced by way of short-term exposure by means of a programmable spatial light modulator or a controlled laser. In that way therefore demetallised regions are only formed there, in which the depth-to-width ratio is appropriate and in which the alphanumeric identification is provided.

The wavelength and the polarisation of the light as well as the angle of incidence of the light are illumination parameters which make it possible to specifically emphasise and selectively process structures.

Chemical properties can also be used for that purpose. The regions 10 and 11 can differ for example by virtue of their solubility in solvents. In that way the photosensitive layer 8 can be 'developed' after the exposure operation with UV light, as is further shown in FIG. 6. 'Development' of the photosensitive layer produces a visible image in mask form of the metallic layer 3m produced with regions of different optical density, from the latent image produced by exposure in the photosensitive layer, by the removal of regions.

If a depth-to-width ratio of >0.3 is usually provided in the regions 4 to produce a transparency which is visible to the human eye, it has surprisingly been found that the depth-to-width ratio which is adequate for development of the photosensitive layer can be substantially less. There is also no need for the metallic layer 3m to be so thin that the regions 4 appear transparent when considered visually. The vapor-deposited carrier film can therefore be opaque, for the reduced transparency can be compensated by an increased exposure dose in respect of the photosensitive layer 8. It is further to be borne in mind that exposure of the photosensitive layer is typically provided in the near UV range so that the visual viewing impression is not crucial in terms of assessing optical density.

Figure 5A:
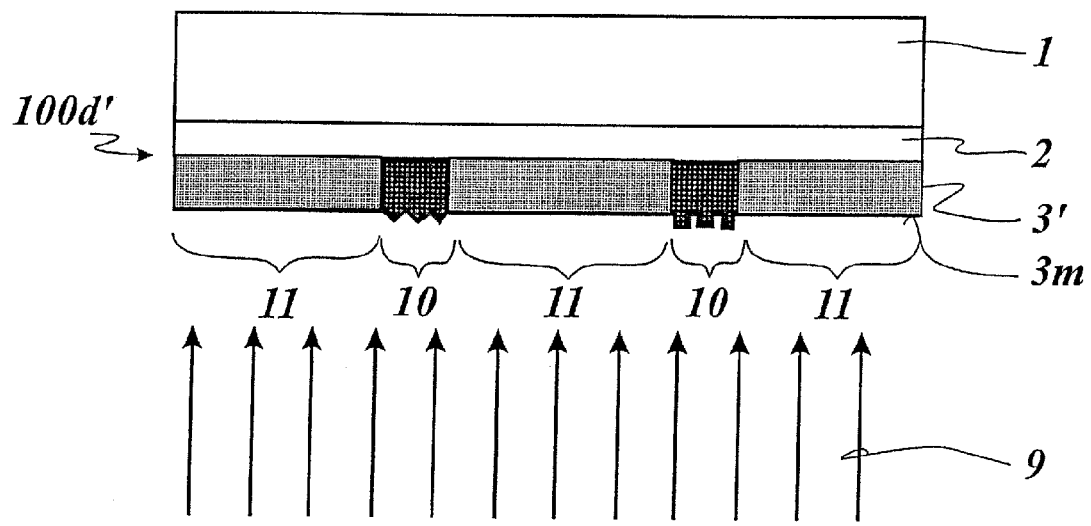
FIG. 5a shows a diagrammatic view in section of a modified configuration of the production stage shown in FIG. 5.
Figure 5B:
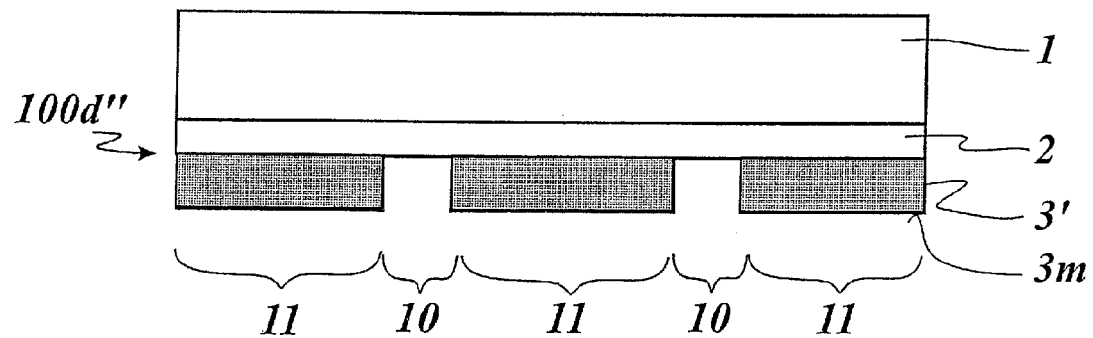
FIG. 5b shows a diagrammatic sectional view of the production stage following that shown in FIG. 5a, FIG. 6 shows a diagrammatic view in section of the fifth production stage of the multi-layer body of FIG. 1.

FIGS. 5a and 5b show a modified embodiment. The photosensitive layer 8 shown in FIG. 5 is not provided in the multi-layer body 100d' in FIG. 5a. Instead there is a replication layer 3' which is a photosensitive washing mask. The multi-layer body 100d' is exposed from below, whereby, in the more greatly exposed regions 100, the replication layer 3' is changed in such a way that it can be washed off.

FIG. 5b now shows a multi-layer body 100d" which functionally corresponds to the multi-layer body shown hereinafter in FIG. 8. It will be noted however that not just the metallic layer 3m is removed with the washing process in the regions 10, but also the replication layer 3'. That provides that transparency is produced in those regions, in relation to the multi-layer body shown in FIG. 8, and fewer production steps are required.

Figure 6:
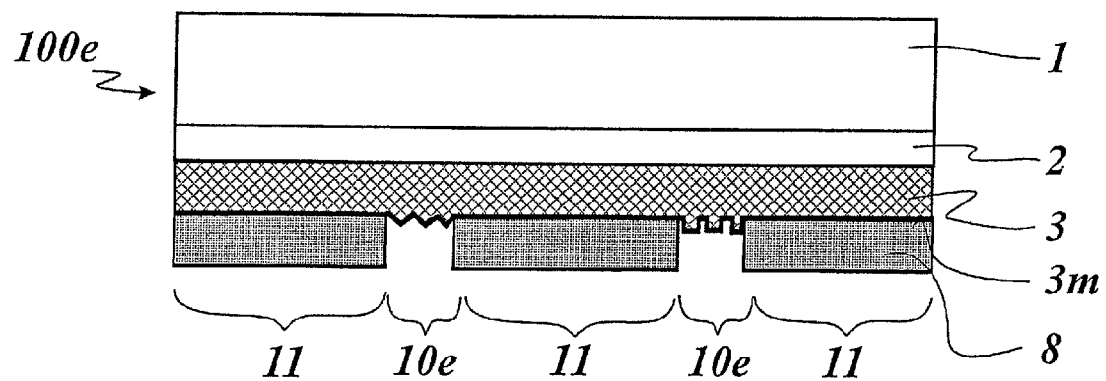

FIG. 6 shows the 'developed' multi-layer body 100e which is formed from the multi-layer body 100d by the action of a solvent applied to the surface of the exposed photosensitive layer 8. That now produces regions 10e in which the photosensitive layer 8 is removed. The regions 10e are the regions 4 described with reference to FIG. 3, with a depth-to-width ratio of greater than zero of the structure elements. The photosensitive layer 8 is retained in regions 11 because they involve the regions 6 which are described with reference to FIG. 3 and in which the structure elements have a depth-to-width ratio of equal to zero.

In the embodiment shown in FIG. 6 the photosensitive layer 8 is formed from a positive photoresist. When using such a photoresist the exposed regions are soluble in the developer. In contrast thereto when using a negative photoresist the unexposed regions are soluble in the developer, as is described hereinafter in the embodiment shown in FIGS. 9 through 12.

Figure 7:
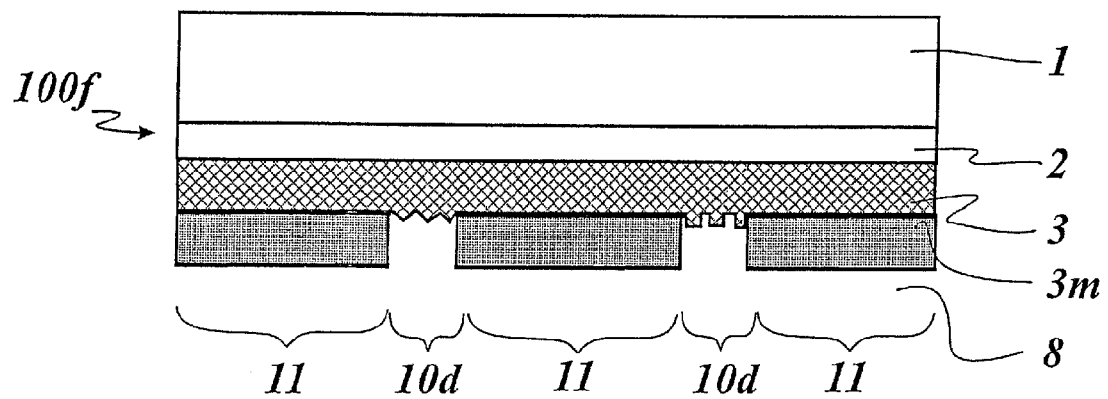
FIG. 7 shows a diagrammatic view in section of the sixth production stage of the multi-layer body of FIG. 1.

Now, as shown by reference to a multi-layer body 100f in FIG. 7, the metallic layer 3m can be removed in the regions 10e which are not protected from the attack of the etching agent by the developed photosensitive layer serving as the etching mask. The etching agent can be for example an acid or a lye. The demetallised regions 10d also shown in FIG. 1 are produced in that fashion.

In that way therefore the metallic layer 3m can be demetallised in accurate register relationship without involving additional technological complication. No complicated and expensive precautions have to be taken for that purpose, such as for example when applying an etching mask by mask exposure or printing. When such a conventional process is involved tolerances of >0.2 mm are usual. In contrast, with the process according to the invention tolerances in the µm range into the nm range are possible, that is to say tolerances which are governed only by the replication process selected for structuring of the replication layer and the origination.

It can be provided that the metallic layer 3m is in the form of a succession of different metals and the differences in the physical and/or chemical properties of the metallic partial layers are put to use. It can be provided for example that aluminum is deposited as the first metallic partial layer, having a high level of reflection and therefore causing reflecting regions to be clearly evident when the multi-layer body is viewed from the carrier side. The second metallic partial layer deposited can be chromium which has a high level of chemical resistance to various etching agents. The etching operation for the metallic layer 3m can now be implemented in two stages. It can be provided that the chromium layer is etched in the first stage, in which case the developed photosensitive layer 8 is provided as the etching mask, and then in the second stage the aluminum layer is etched, in which case the chromium layer now acts as the etching mask. Such multi-layer systems permit a greater degree of flexibility in the choice of the materials used in the production procedure for the photoresist, the etching agent for the photoresist and the metallic layer.

Figure 8:
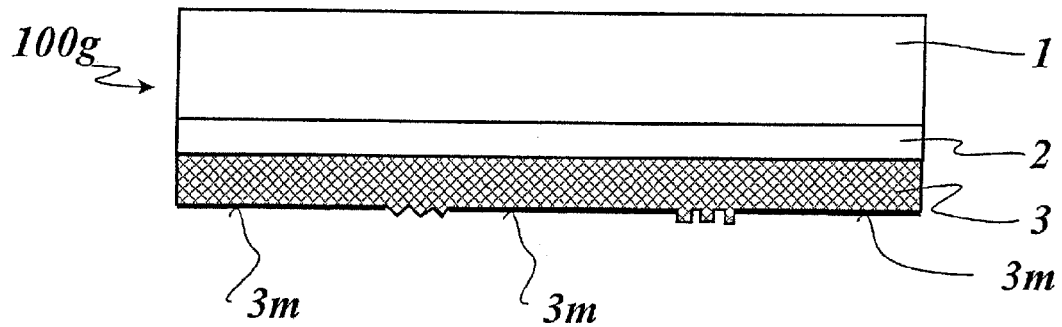
FIG. 8 shows a diagrammatic view in section of the seventh production stage of the multi-layer body of FIG. 1.

FIG. 8 shows the optional possibility of removing the photosensitive layer after the production step shown in FIG. 7. FIG. 8 illustrates a multi-layer body 100g formed from the carrier film 1, the functional layer 2, the replication layer 3 and the structured metallic layer 3m.

The multi-layer body 100g can be converted into the multi-layer body 100 shown in FIG. 1 by subsequently applying the adhesive layer 12.

Figure 9:
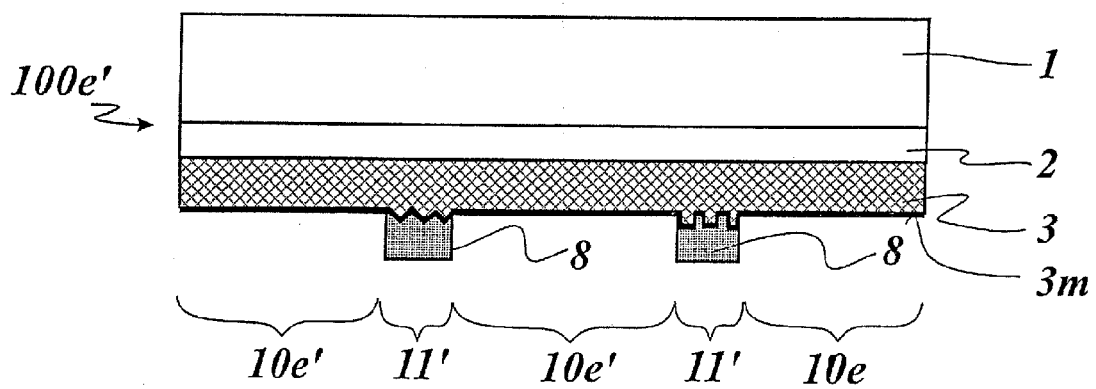
FIG. 9 shows a diagrammatic view in section of the fifth production stage of a second embodiment of the multi-layer body of FIG. 1.

FIG. 9 now shows a second embodiment of a multi-layer body 100e in which the photosensitive layer 8 is formed from a negative photoresist. As can be seen from FIG. 9 a multi-layer body 100e' has regions 10e' in which the unexposed photosensitive layer 8 is removed by development. The regions 10e' involve opaque regions of the metallic layer 3m (see reference 6 in FIG. 3). The exposed photosensitive layer 8 is not removed in regions 11, that involves less opaque regions of the metallic layer 3m (see reference 4 in FIG. 3), that is to say regions of lower optical density than the regions 10e'.

Figure 10:
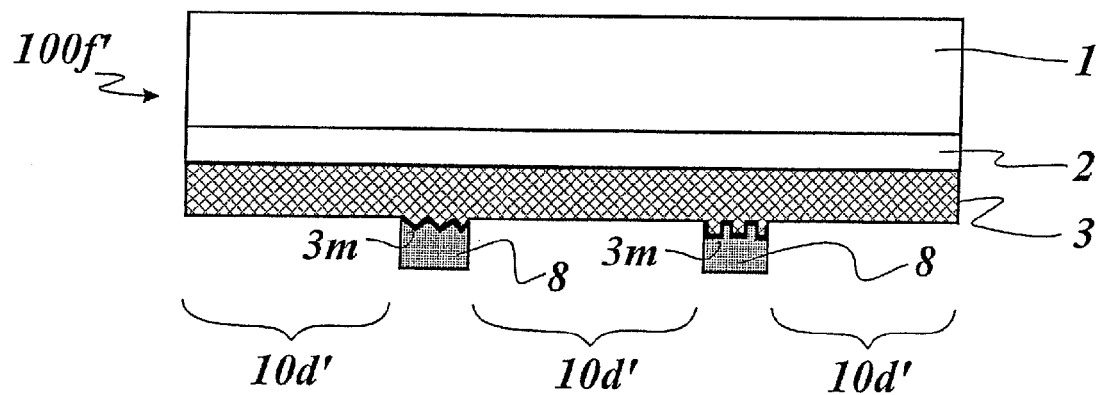
FIG. 10 shows a diagrammatic view in section of the sixth production stage of a second embodiment of the multi-layer body of FIG. 1.

FIG. 10 shows a multi-layer body 100f formed by removal of the metallic layer 3m by an etching process from the multi-layer body 100e' (FIG. 9). For that purpose the developed photosensitive layer 8 is provided as the etching mask which is removed in the regions 10e' (FIG. 9) so that the etching agent there breaks down the metallic layer 3m. That results in the formation of regions 10d' which no longer have a metallic layer 3m.

Figure 11:
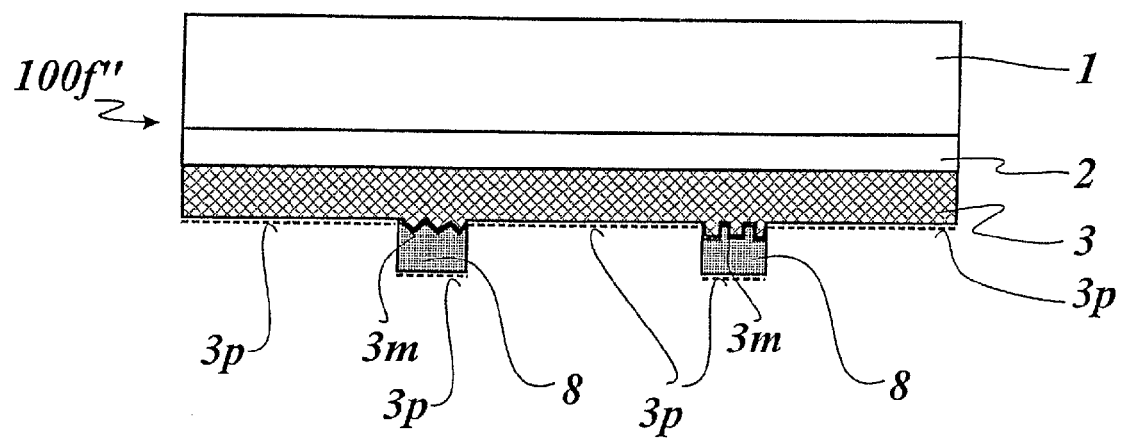
FIG. 11 shows a diagrammatic view in section of the seventh production stage of a second embodiment of the multi-layer body of FIG. 1.

As shown in FIG. 11 a multi-layer body 100f'' is now formed from the multi-layer body 100f', having a second layer 3p which covers the exposed replication layer 3 in the regions 10d'. The layer 3p can be a dielectric such as $TiO_2$ or ZnS, or a polymer. Such a layer can be for example vapor-deposited over a surface, in which respect it can be provided that the layer is formed from a plurality of mutually superposed thin layers which can differ for example in their refractive index and which in that way can produce color effects in the light shining thereon. A thin layer having color effects can be formed for example from three thin layers with a high-low-high-index configuration. The color effect appears less striking in comparison with metallic reflecting layers, which is advantageous for example if patterns are to be produced on passports or identity cards in that way. The patterns can appear to the viewing person for example as transparent green or red.

Polymer layers can be for example in the form of organic semiconductor layers. In that way an organic semiconductor component can be formed by a combination with further layers.

Figure 12:
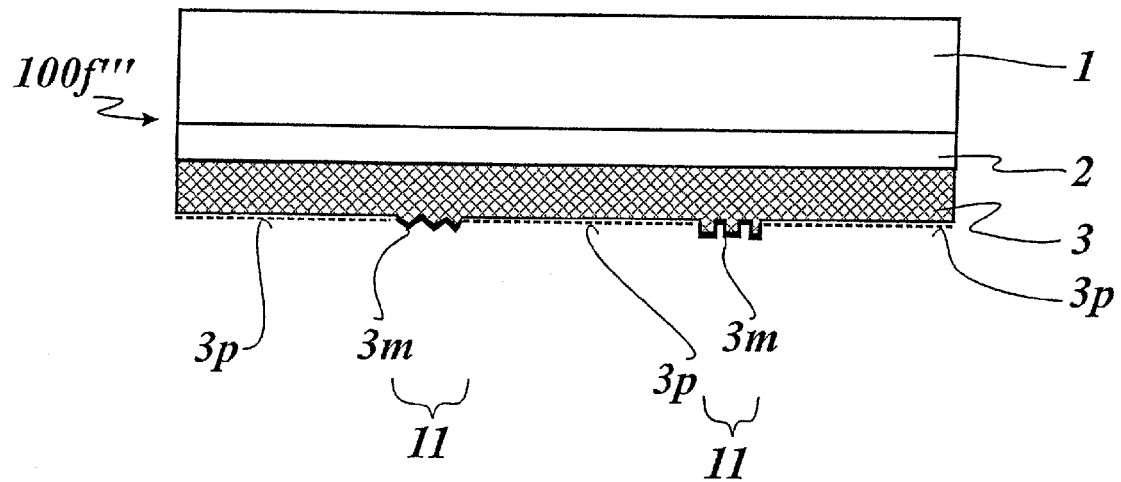
FIG. 12 shows a diagrammatic view in section of the eighth production stage of a second embodiment of the multi-layer body of FIG. 1.

FIG. 12 now shows a multi-layer body 100f''' formed from the multi-layer body 100f'' (FIG. 11) after removal of the remaining photosensitive layer. That can involve a 'lift-off' procedure. In that way the second layer 3p applied in the previous step is there removed again at the same time. Therefore, adjacent regions with layers 3p and 3m are now formed on the multi-layer body 100f''', which can differ from each other for example in their optical refractive index and/or their electrical conductivity.

It can be provided that the metallic layer 3m is galvanically reinforced and in that way the regions 11 are for example in the form of regions affording particularly good electrical conductivity.

It can also be provided that the regions 11 are transparent and for that purpose the metallic layer 3m is removed by etching. It is possible to provide an etching agent which does not attack the layer 3p applied in the other regions. It can however also be provided that the etching agent is caused to act only until the metallic layer is removed.

It can further be provided that there is then applied to the multi-layer body 100f''' (FIG. 12) a third layer which can be formed from a dielectric or a polymer. That can be done with the process steps described hereinbefore, by a procedure whereby once again a photosensitive layer is applied, which after exposure and development covers the multi-layer body 100f''' outside the regions 11. The third layer can now be applied as described hereinbefore and then the remains of the photosensitive layer are removed and thus at the same time the third layer is removed in those regions. In that way for example layers of organic semiconductor components can be structured in a particularly fine fashion and in accurate register relationship.

Figure 13:
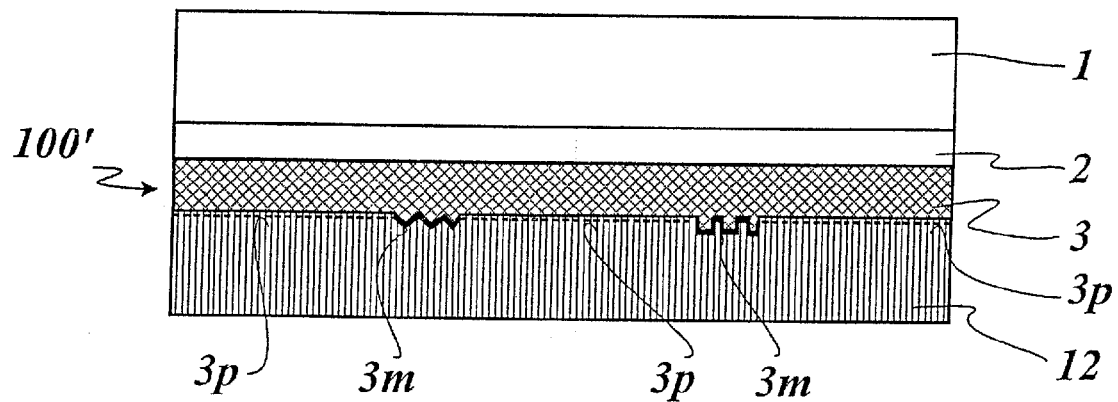
FIG. 13 shows a diagrammatic view in cross-section of a second stage of a multi-layer body according to the invention.

FIG. 13 now shows a multi-layer body 100' which is formed from the multi-layer body 100f''' (FIG. 12) by the addition of the adhesive layer 12 shown in FIG. 1. The multi-layer body 100' has been produced, like the multi-layer body 1 shown in FIG. 1, by using the same replication layer 3. It is therefore possible with the process according to the invention to produce multi-layer bodies of differing configurations, starting from a unitary layout.

The process according to the invention can be further developed without adverse effects in terms of quality in order to structure further layers in accurate register relationship.

For that purpose it can be provided that further optical effects such as total reflection, polarisation and spectral transparency of the previously applied layers are used to form regions of differing optical density in order to produce exposure masks involving accurate register relationship.

It can also be provided that different local absorption capability is afforded by mutually superposed layers and exposure or etching masks are produced by laser-supported thermal ablation.

FIGS. 14a through 14d now show by reference to an embodiment by way of example how the metallic layer 3m arranged in the regions 11 can be removed in accurate register relationship from the multi-layer body 100f''' shown in FIG. 12 and can be replaced in accurate register relationship by a non-metallic layer 3p'. The layer 3p' can be a dielectric layer which differs in its optical refractive index from the layer 3p.

Figure 14A:
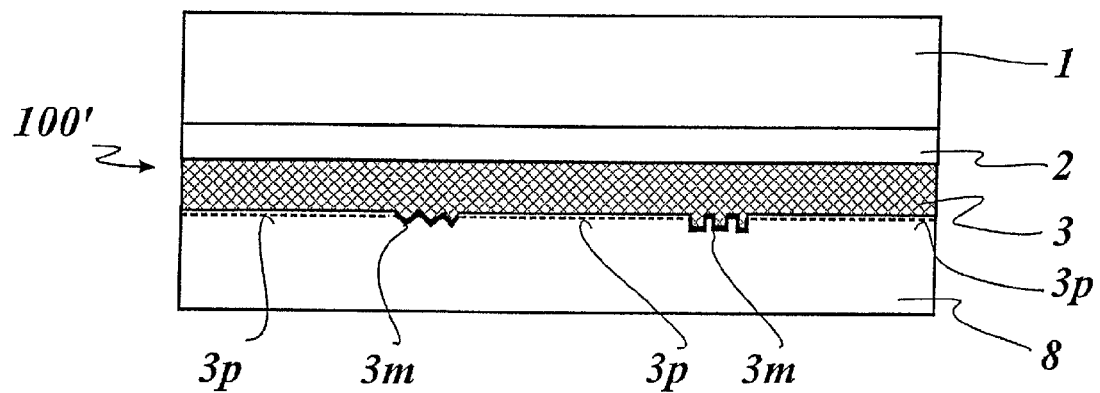
FIGS. 14a through 14d show diagrammatic views in cross-section of the production steps of a third embodiment of a multi-layer body according to the invention.

FIG. 14a shows a multi-layer body 100g in which the metallic layer 3m in the regions 4 is such that it has a different optical density in relation to the layer 3p in the regions 6. A photosensitive layer 8 covers over the regions 3p and 3m disposed on the replication layer 3.

Figure 14B:
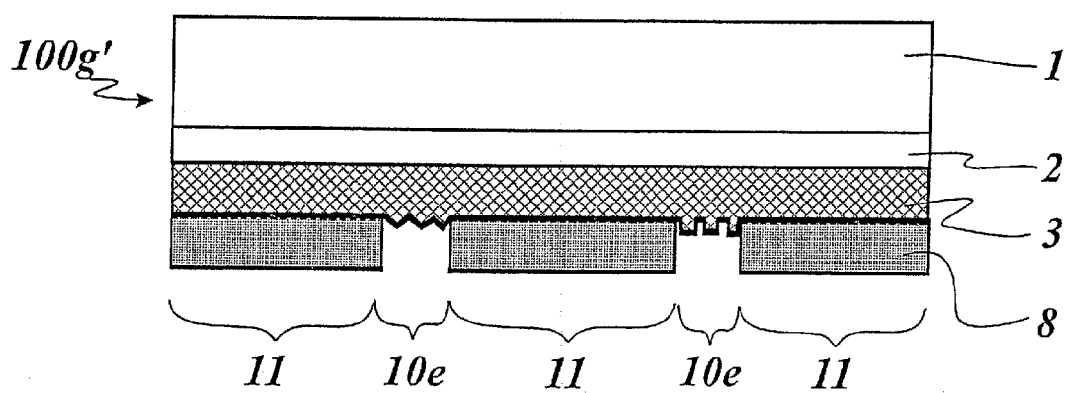

FIG. 14b now shows a multi-layer body 100g' obtained by exposure and development of the photosensitive layer 8, as described hereinbefore with reference to FIGS. 5 and 6. The regions 11 covered with the developed photosensitive layer form an etching mask so that the metallic layer 3m can be removed by etching in the regions 10e in which the photosensitive layer is removed after the development operation.

Figure 14C:
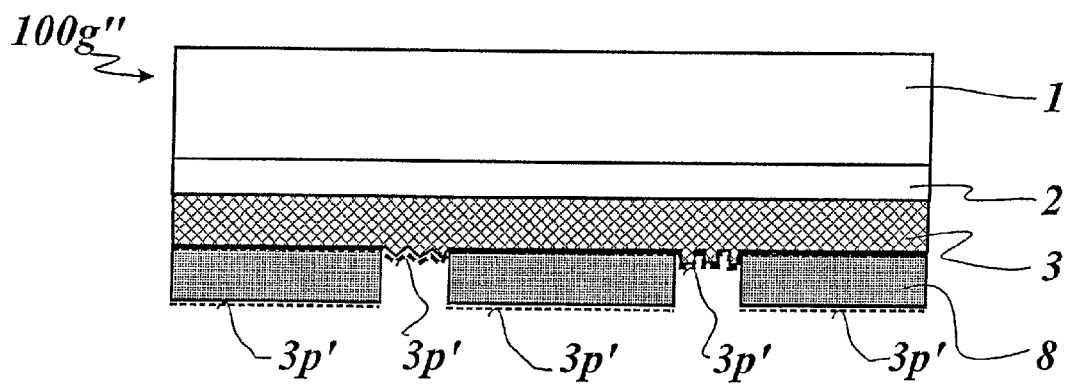

FIG. 14c shows after a further process step a multi-layer body 100g'' on which a layer 3p' which for example can be in the form of a dielectric is applied over the full surface area involved. The layer 3p' can also be in the form of a thin-layer system comprising a plurality of successively applied layers, whereby the layer 3p' can produce color change effects in known manner.

Figure 14D:
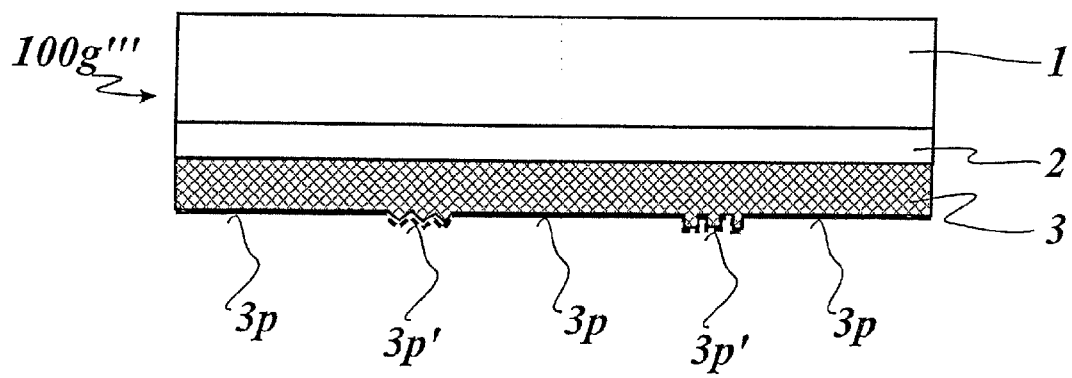

FIG. 14d now shows a multi-layer body 100g''' after removal of the remains of the photosensitive layer 8 and the regions arranged thereon of the layer 3p', which multi-layer body 100g''' can be made into a complete multi-layer body for example by the addition of an adhesive layer as described hereinbefore with reference to FIG. 13.

On the replication layer 3 the multi-layer body 100g''' has regions which are covered with the layer 3p and regions which are covered with the layer 3p'.

As the layers 3p and/or 3p' can be thin-layer systems, they can produce color change effects, as already described hereinbefore. In that respect it can be provided for example that the layer 3p which in the embodiment in FIG. 14d covers over the regions of the replication layer 3 with a depth-to-width ratio of greater than zero, is in the form of a thin-layer system. It is possible in that way for filigree patterns such as guilloche patterns to be in the form of security features which unobtrusively stand out from their surroundings and still clearly visibly show representations disposed therebeneath.

The process described with reference to FIGS. 14a through 14d can be used for applying further layers. Because the layers 3p and 3p' are thin layers of the order of magnitude of some μm or nm, the structures introduced into the replication layer 3 are retained so that for example it is possible to apply a further metallic layer which in the regions of the replication layer 3 with a depth-to-width ratio of greater than zero involves a lower optical density than in the regions with a depth-to-width ratio equal to zero. In that way the further metallic layer can be used as a mask layer which can be partially removed with the above-described process steps or which can be provided as a temporary intermediate layer in order to apply one or more non-metallic layers in accurate register relationship.

The process according to the invention includes the possibility, for forming masks, of providing regions which both have a depth-to-width ratio of greater than zero but which is of differing values, whereby the optical density of the regions coated with the same surface rate is different.

Figure 15:
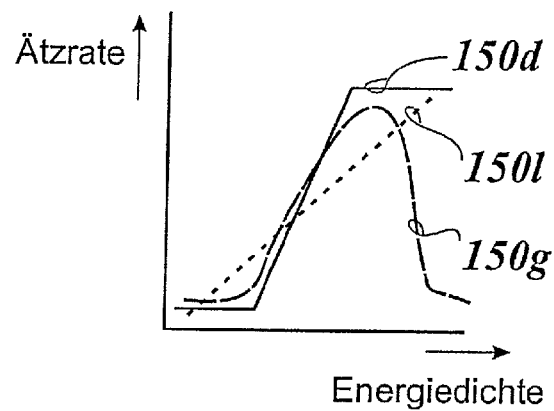
FIG. 15 shows a schematic diagram of etching rates of a photosensitive layer.

FIG. 15 now shows a diagrammatic graphic representation of three etching characteristics of developers which are intended for producing the etching mask from the photosensitive layer. The etching characteristics represent the etching rate, that is to say the removal of material per unit of time, in dependence on the energy density with which the photosensitive layer was exposed. A first etching characteristic 150l is linear. Such an etching characteristic can be preferred if development is effected in accordance with time.

In general however a binary etching characteristic 150b can be preferred because only minor differences are required in the energy density in order to produce a markedly different etching rate and in that way, with slight differences in the optical density of adjacent regions, to implement complete removal of the mask layer in the regions involving a higher depth-to-width ratio or vice-versa, with a high level of certainty.

A third etching characteristic 150g involving a bell-shaped configuration which can be adjusted by the choice of the photoresist and the process implementation can be used in order to remove or obtain structures selectively in dependence on the optical density of the region. That etching characteristic can be particularly preferred when for example there are three regions involving a differing optical density.

Figure 16A:
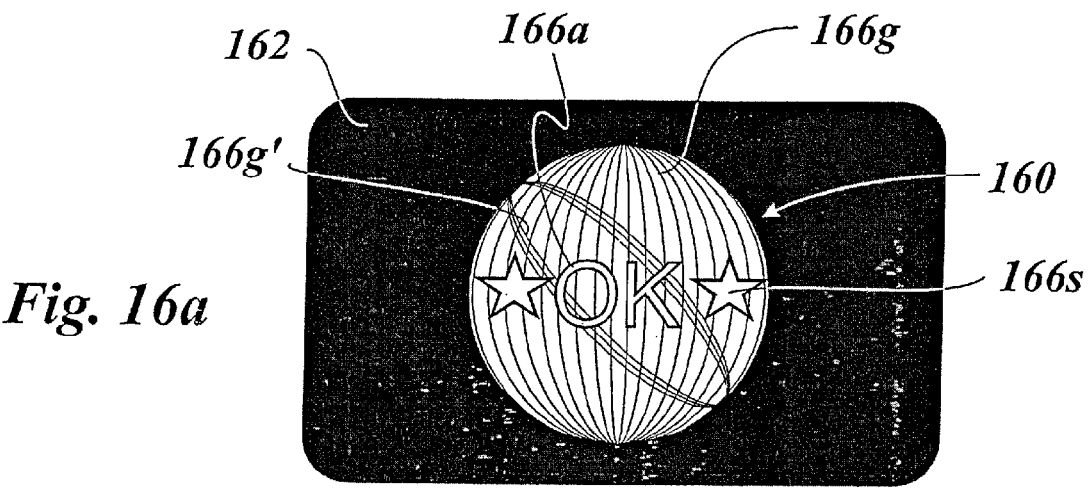
FIGS. 16a and 16b show a first example of use of a multi-layer body according to the invention.
Figure 16B:
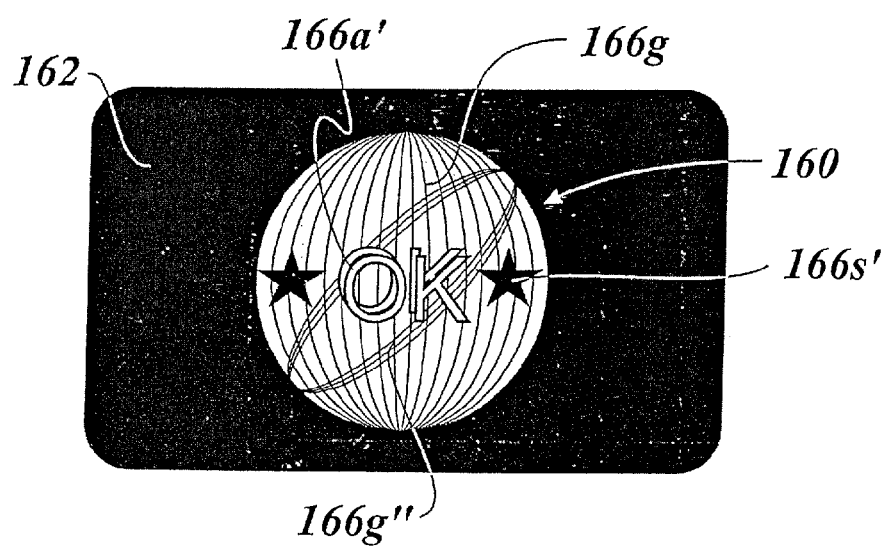

FIGS. 16a and 16b now show a first example of use involving a multi-layer body 160 according to the invention. It can be arranged for example on the front side of an ID card 162. The multi-layer body 160 is provided with a metallic layer which is partially removed in register relationship and which covers over diffractive structures and which is in the form of guilloche patterns 166g, 166g' and 166g'', star-shaped elements 166s and alphanumeric characters 166a and 166a'. In that respect FIGS. 16a and 16b show different views of the multi-layer body 160, which are produced by pivoting the ID card 162. The guilloche patterns 166g are fine regions in line form, which retain their position upon pivoting movement of the ID card 162. The guilloche patterns 166g' and 166g'' are fine regions in line form, which become visible in succession upon pivoting movement of the ID card 162 so that the illusion of a movement is produced. The star-shaped elements 166s and 166s' are configurations of a region with a holographic structure so that they involve a differing size and/or color depending on the respective tilted position of the ID card 162. The alphanumeric characters 166a and 166a' can involve for example a region having a Kinegram® structure.

Figure 17A:
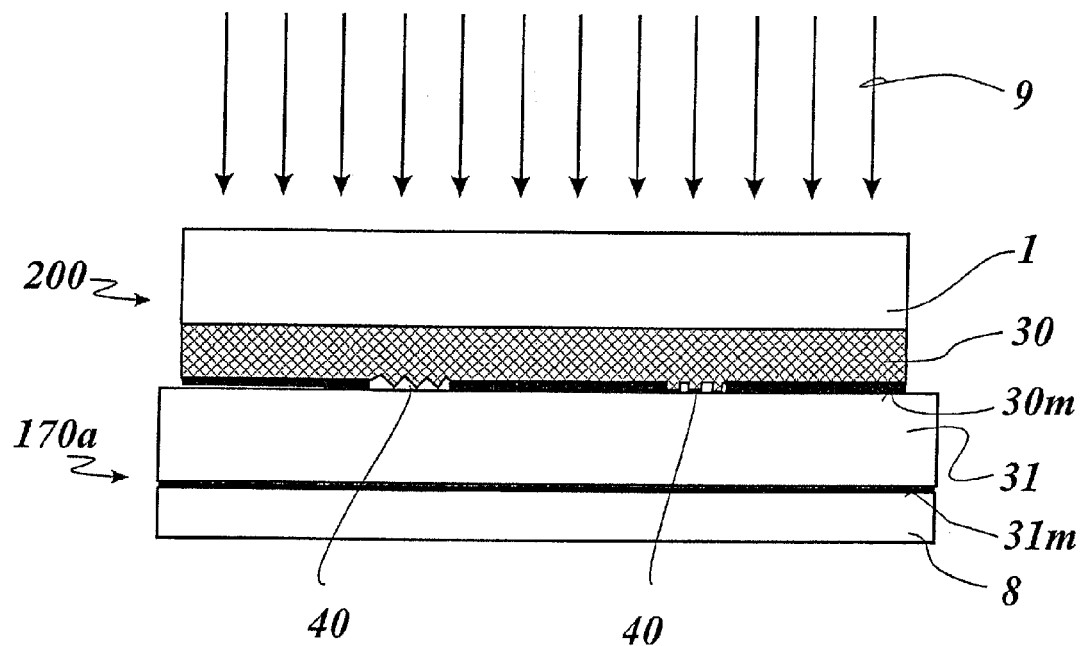
FIGS. 17a through 17d show a second example of use of a multi-layer body according to the invention.

FIGS. 17a through 17d show a second example of use of a multi-layer body according to the invention. A first multi-layer body 20 is in the form of an exposure mask in this example of use. As shown in FIG. 17a the first multi-layer body 20 comprises a carrier film 1 with a replication layer 30 coated with a partially shaped metallic layer 30m. The first multi-layer 20 can preferably have been produced with the processes described hereinbefore.

As shown in FIG. 17a the first multi-layer body 200 is disposed on a second multi-layer body 170a which is formed from a carrier film 31, a metallic layer 31m and a photosensitive layer 8. The outside of the metallic layer 30m of the first multi-layer body 200 faces towards the outside of the carrier film 31 and bears thereagainst. The metallic layer 30m is removed in regions 40 in which, as described hereinbefore, the replication layer 30 is of a greater depth-to-width ratio than in the regions in which the metallic layer 30m is not removed.

Figure 17B:
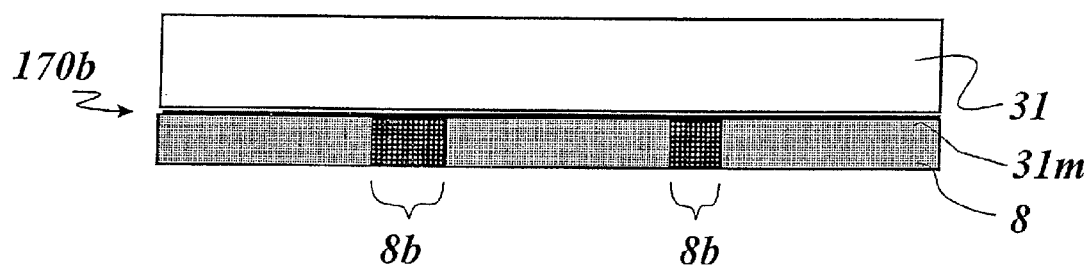

In the example of use shown in FIG. 17a the second multi-layer body 170a is exposed through the first multi-layer body 200 which is in the form of an exposure mask. Exposure is indicated by arrows 9. Because of the extremely small layer thicknesses of the carrier film 31 and the metallic layer 31m, the image of the partial, metallic layer 31m is now transferred on to the photosensitive layer 8, whereby, as shown in FIG. 17b, a multi-layer body 170b is produced in which the photosensitive layer 8 has regions 8b which have been more greatly exposed. As has been found, in that case the metallic layer 31m arranged in the beam path can be opaque. The opaque metallic layer 31m admittedly reduces the illumination strength produced on the photosensitive layer 8, but it does not interfere with the production of more greatly exposed regions 8b. As already stated the metallic layer 31m is of a small layer thickness so that imaging errors for example due to scatter are not to be observed.

Figure 17C:
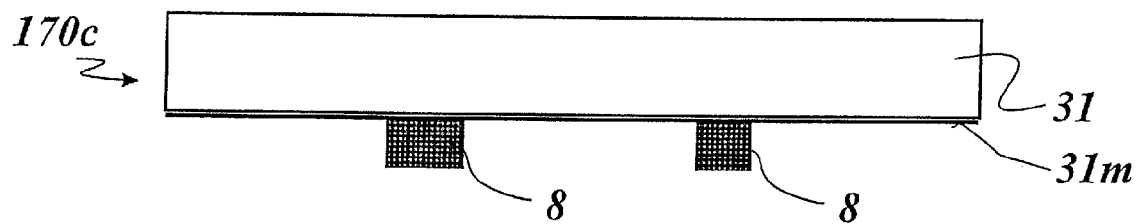

FIG. 17c now shows a multi-layer body 170c which is formed by development of the photosensitive layer 8 from the multi-layer body 170b in FIG. 17c. In this example of use the photosensitive layer 8 is a so-called negative photoresist in which unexposed regions are removed by development.

Figure 17D:
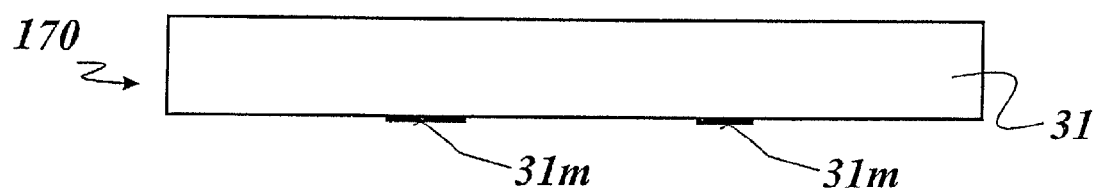

FIG. 17d finally shows a multi-layer body 170 which is formed by etching of the metallic layer 31m and removal of the remains of the photosensitive layer 8, from the multi-layer body 170c of FIG. 17c. The metallic layer 31m is produced in the regions which were covered by the developed photosensitive layer 8. It can form on the multi-layer body 170 for example an electrical component such as an antenna and/or a coil, or one or more conductor tracks.

Although in this example of use register accuracy cannot be set without adjustment, nonetheless it is advantageously possible to produce filigree patterns which in their partial regions are oriented in accurate register relationship with each other. It can however also be provided that orientation in accurate register relationship is dispensed with, if for example the multi-layer body 170 forms a security feature such as a guilloche pattern covering over a security document, which does not have to be oriented in accurate register relationship in order to perform the security function.

It can further be provided that the regions 40 are differentiated in respect of their depth-to-width ratio and/or their polarisation dependency and in that way it is possible to form a lithographic gray scale mask which can be of very small thickness. Conventional glass masks cannot be thinner than 5 μm, which can limit the applicability thereof.

The invention claimed is:

1. A multi-layer body having a replication layer and at least one partially shaped first layer arranged on the replication layer, wherein a diffractive first relief structure is shaped in a first region of the replication layer and a diffractive second relief structure is shaped in a second region of the replication layer, the diffractive first relief structure is not shaped in the replication layer in the second region of the replication layer, and the first layer is entirely removed from one of the first or second region in a manner determined by the arrangement of the diffractive first relief structure so that the first layer is disposed in accurate register relationship with the first relief structure in the first region but not in the second region or in accurate register relationship with the second relief structure in the second region but not in the first region, and wherein each of the diffractive first and second relief structures comprises a plurality of peaks and troughs formed in the respective first and second regions of the replication layer whereby the first layer is deposited locally in varying thicknesses due to the respective diffractive relief structure on which it is disposed, such that the first layer has a transmission property influenced by the respective diffractive relief structure on which it is disposed, and wherein the first relief structure has a greater relief depth than the second relief structure.

2. A multi-layer body as set forth in claim 1, wherein the second region is shaped in pattern form and the first region and the second region are arranged in directly mutually adjacent juxtaposed relationship.

3. A multi-layer body as set forth in claim 1, wherein the first region comprises two or more partial regions enclosed by the second region, and the first layer is a reflection layer which is removed in the second region and thus arranged in accurate register relationship with the first relief structure.

4. A multi-layer body as set forth in claim 1, wherein the partial regions of the second region are of a width of less than 2 mm.

5. A multi-body as set forth in claim 1, wherein a second layer is arranged in the regions of the replication layer in which the first layer is not present.

6. A multi-layer body as set forth in claim 5, wherein the first layer and/or the second layer is/are formed from a dielectric.

7. A multi-layer body as set forth in claim 6 wherein the first layer and the second layer have different refractive indices.

8. A multi-layer body as set forth claim 5, wherein the first layer and/or the second layer is/are formed from a polymer.

9. A multi-layer body as set forth in claim 5, wherein the first layer and/or the second layer is/are in the form of a colored layer.

10. A multi-layer body as set forth in claim 5, wherein the first layer and/or the second layer is/are formed from a plurality of partial layers.

11. A multi-layer body as set forth in claim 10 wherein the partial layers form a thin film layer system.

12. A multi-layer body as set forth in claim 10 wherein the partial layers are formed from different materials.

13. A multi-layer body as set forth in claim 5, wherein the first layer and/or the second layer forms/form an optical pattern.

14. A multi-layer body as set forth in claim 5, wherein the first layer and/or the second layer forms/form a raster image.

15. A multi-layer body as set forth in claim 5, wherein the first layer and/or the second layer form one or more optical security features.

16. A multi-layer body as set forth in claim 5, wherein the first layer and/or the second layer form or forms an electronic component.

17. A multi-layer body as set forth in claim 5, wherein the first layer and/or the second layer form an orientation layer for the orientation of liquid crystals.

18. A multi-layer body as set forth in claim 17, wherein the orientation layer has diffractive structures for the orientation of the liquid crystals, which are locally differently oriented so that when viewed under polarized light the liquid crystals represent an item of information.

19. A multi-layer body as set forth in claim 1 , wherein the multi-layer body is a transfer film, a hot stamping film or a laminating film.

20. A multi-layer body comprising:
a replication layer having a first diffractive relief structure shaped in a first region of the replication layer and a second diffractive relief structure shaped in a second region of the replication layer; and
a first layer arranged on the replication layer,
wherein the first layer, when disposed in the first region, is deposited locally in varying thickness due to the first diffractive relief structures and, when disposed in the second region, is deposited locally in varying thickness due to the second diffractive relief structure such that the transmission properties of the first layer are influenced by the diffractive relief structure on which it is disposed, and
the first layer is entirely removed from one of the first or second regions in a manner determined by the arrangement of the first and second relief structures so that the first layer is disposed in accurate register relationship with the first relief structure in the first region but not in the second region or with the second relief structure in the second region but not in the first region, and
wherein the product of spatial frequency and relief depth of the first relief structure is greater than the product of spatial frequency and relief depth of the second relief structure.

* * * * *

UNITED STATES PATENT AND TRADEMARK OFFICE
CERTIFICATE OF CORRECTION

PATENT NO. : 8,450,029 B2
APPLICATION NO. : 13/252541
DATED : May 28, 2013
INVENTOR(S) : Staub et al.

Page 1 of 1

It is certified that error appears in the above-identified patent and that said Letters Patent is hereby corrected as shown below:

ON THE TITLE PAGE:

Item (75) Inventors: now reads "Rene Staub, Hagendom (CH); Wayne Robert Tompkin, Baden (CH); Andreas Schilling, Hagendom (CH)"
should read --Rene Staub, Hagendorn (CH); Wayne Robert Tompkin, Baden (CH); Andreas Schilling, Hagendorn (CH)--

IN THE SPECIFICATION:

Column 12, line 38 now reads "in the same manner as the process of with"
should read --in the same manner with--

Signed and Sealed this
Tenth Day of September, 2013

Teresa Stanek Rea
*Acting Director of the United States Patent and Trademark Office*